(12) United States Patent
Fujimori et al.

(10) Patent No.: US 7,008,180 B2
(45) Date of Patent: Mar. 7, 2006

(54) AXIAL-FLOW FAN AND PROJECTOR PROVIDED WITH THE SAME

(75) Inventors: Motoyuki Fujimori, Suwa (JP); Masakazu Kitamura, Matsumoto (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 10/603,741

(22) Filed: Jun. 26, 2003

(65) Prior Publication Data

US 2005/0019165 A1 Jan. 27, 2005

(30) Foreign Application Priority Data

Jun. 28, 2002 (JP) ........................................ 2002-191145

(51) Int. Cl.
*F04D 29/38* (2006.01)
*G03B 21/16* (2006.01)

(52) U.S. Cl. ................. 415/121.2; 415/119; 415/211.2; 415/220; 415/222; 416/175; 416/183; 416/203; 417/312; 417/354; 417/423.9; 417/423.15; 353/57; 353/61; 362/294

(58) Field of Classification Search ................. 416/175, 416/183, 203, 179, 182, 185, 238, 243, 223 R, 416/DIG. 2, 198 R, 200 R; 415/119, 121.2, 415/211.2, 222, 208.1, 220; 417/354, 353, 417/423.15, 312, 423.9; 353/57, 58, 60, 61; 362/294

See application file for complete search history.

(56) References Cited

U.S. PATENT DOCUMENTS

| | | | | | |
|---|---|---|---|---|---|
| 1,713,648 | A | * | 5/1929 | Feinberg et al. | 415/121.2 |
| 2,415,621 | A | * | 2/1947 | Arnhym | 415/121.2 |
| 3,421,687 | A | * | 1/1969 | Daily | 415/121.2 |
| 4,734,015 | A | * | 3/1988 | Wrobel | 417/354 |
| 4,781,526 | A | * | 11/1988 | Mead | 415/121.2 |
| 6,045,327 | A | * | 4/2000 | Amr | 415/211.2 |
| 6,132,049 | A | * | 10/2000 | Yamaguchi et al. | 353/57 |
| 6,488,472 | B1 | * | 12/2002 | Miyazawa | 416/203 |
| 6,572,336 | B1 | * | 6/2003 | Horng et al. | 416/183 |
| 6,793,343 | B1 | * | 9/2004 | Nakano et al. | 353/57 |
| 2003/0161722 | A1 | * | 8/2003 | Galassi | 415/121.2 |
| 2003/0231956 | A1 | * | 12/2003 | Lin | 415/222 |

FOREIGN PATENT DOCUMENTS

| | | | | |
|---|---|---|---|---|
| FR | 1012041 A | * | 4/1952 | 416/183 |
| JP | S56-86397 U | | 7/1981 | |
| JP | S59-105096 U | | 7/1984 | |

* cited by examiner

*Primary Examiner*—Christopher Verdier
(74) *Attorney, Agent, or Firm*—Oliff & Berridge, PLC

(57) ABSTRACT

An axial-flow fan has a plurality of main fins (702), and auxiliary fins (703) provided between the main fins (702), where the position of a front end of the auxiliary fin (703) relative to X axis and the position of a front end of the main fin (702) adjoining the auxiliary fin in reverse-rotary direction are aligned, the height of the auxiliary fin (703) is approximately three fourths of the height of the main fin (702), and the cross sections of the main fin (702) and the auxiliary fin (703) taken along the axial direction of the main shaft are streamlined.

38 Claims, 23 Drawing Sheets

AXIAL-FLOW FAN AND PROJECTOR PROVIDED WITH THE SAME

BACKGROUND OF THE INVENTION

1. Technical Field of the Invention

The present invention relates to an axial-flow fan and a projector. More specifically, the present invention is directed to an axial-flow fan capable of securing high static pressure and reducing noise, which is suitably used for an apparatus having a light source, such as a projector.

2. Description or Related Art

Conventionally, a projector has been used for presentations at conferences, academic societies, exhibitions, etc. Such a projector modulates a light bean irradiated by a light source in accordance with image information to form an optical image, and projects the optical image in an enlarged manner.

In such a projector, the luminance of the light source has to be enhanced for sharply displaying the optical image, and the heat generated by the light source has to be exhausted to the outside of the projector. Accordingly, a cooling mechanism is provided for drawing in external cooling air by a fan and guiding the cooling air to a predetermined spot by a duct. The air is discharged to the outside from an exhaust hole provided on the projector.

In order to guide the cooling air to the exhaust hole, for sufficiently cooling the interior of the projector, high static pressure has to be secured. If a conventional fan is used for obtaining sufficient flow rate rather than static pressure, the fan has to be rotated at a high speed to secure high static pressure and to obtain a predetermined flow rate. Further, density of heat sources is increased in accordance with size reduction of the projector, so that a predetermined static pressure and flow rate have to be secured for sufficient cooling. Thus, the fan has to be rotated at a high speed. As described above, in order to secure the necessary flow rate and static pressure for sufficient cooling, high-speed rotation of the fan is inevitable, which result in noise. Since such projectors have come to be used not only for presentation purposes but also for home-theater system, reduction of noise is strongly desired.

An object of the present invention is to provide an axial-flow fan capable of securing high static pressure while reducing noise, and a projector having the axial-flow fan.

SUMMARY OF THE INVENTION

An exemplary embodiment of the axial-flow fan, according to an aspect of the present invention has: a main shaft; a plurality of main fins provided on the outer circumference of the main shaft, the main fins being inclined relative to an axial direction of the main shaft, where a front end in a rotary direction of the main fin is located on an intake side and a rear end in the rotary direction of the main fin is located on an exhaust side when the axial-flow fan transfers air; and an auxiliary fin is provided between mutually adjoining main fins, in which the height of the auxiliary fin from the front end to the rear end in the rotary direction of the auxiliary fin along the axial direction of the main shaft is not less than the half and not more than four fifths of the height of the main fin from the front end to the rear end of the main fin along the axial direction of the main shaft, and in which, when the main fins are arranged by a pitch W in the rotary direction, the front end in the rotary direction of the auxiliary fin is located within $-\frac{1}{8} \times W$ to $+\frac{1}{8} \times W$ along the rotary direction from the front end in rotary direction of the main fin adjoining in a reverse rotary direction.

According to the above arrangement, since the speed of the air flowing through the axial-flow fan is accelerated and is leveled, the turbulence can be restrained. Accordingly, even when the fan is rotated at a high speed, the noise caused by the collision of the turbulence from the main fin and the auxiliary fin can be reduced, thus providing a low-noise axial-flow fan while maintaining high static pressure.

Further, since the height of the auxiliary fan is not less than half and not more than four fifths of the height of the main fin and the front end of the auxiliary fin is located within the range along the rotary direction from $-\frac{1}{8} \times W$ to $+\frac{1}{8} \times W$ (more preferably from $-\frac{1}{8} \times W$ to $+\frac{1}{8} \times W$) from the front end of the main fin adjoining in a reverse rotary direction, the turbulence can be effectively prevented.

Further, the provision of the auxiliary fin reduces the amount of light leaked through the gap between the main fins of the fan when the axial-flow fan is used for a device having a light source, such as a projector.

In the above, the rear end of the auxiliary fin may preferably be spaced apart from the rear end of the main fin adjoining in the reverse rotary direction by $\frac{1}{2} \times W$ in the rotary direction. Since the rear end of the auxiliary fin is located at a position spaced apart from the rear end of the main fin adjoining in the reverse rotary direction by $\frac{1}{2} \times W$, the speed of the air flowing through the axial-flow fan can be further effectively leveled, thus preventing the turbulence.

When an attachment angle of the auxiliary fin relative to the main shaft is $\theta_2$ and an attachment angle of the main fin relative to the main shaft is $\theta_1$, the maximum of $\theta_2$ may preferably be represented as $\theta_2 = \theta_1 + 5°$. When the maximum of the attachment angle $\theta_2$ of the auxiliary fin relative to the main shaft is represented as $\theta_1 + 5°$ to narrow the gap between the auxiliary fin and the main fin, the flow rate can be enhanced and the airflow can be rectified. As a result, turbulence can be effectively prevented, thus reducing the noise.

In the above, the cross section of the main fin along the axial direction of the main shaft may preferably be streamlined or approximately streamlined, and the cross section of the auxiliary fin may preferably be similar or approximately similar to the main fin. When the cross sections taken along the axial direction of the main fin and the auxiliary fin along the main shaft are streamlined or approximately streamlined, the resistance between the air flowing through the axial-flow fan and the main fin and the auxiliary fin can be reduced, so that the noise can be lowered.

In the above, the thickness of the cross section of the auxiliary fin taken along the axial direction of the main shaft may preferably be not more than the thickness of the cross section of the main fin taken along the axial direction of the main shaft. When the thickness of the cross section of the auxiliary fin taken along the axial direction of the main shaft is not more than the thickness of cross section of the main fin taken along the axial direction of the main shaft, the resistance of the air flow can be reduced, so that the turbulence can be further effectively prevented.

In the above, the main fin may preferably be superposed on the adjoining main fins when seen from the exhaust side. Since the main fins are arranged to be superposed when seen from the exhaust side, the amount of light leakage through the gap between the fins can be prevented when the axial-flow fan is used in a machine having a light source, such as a projector.

In the above, a mirrored surface may preferably be formed on a positive pressure side and a negative pressure side of the main fin. The positive pressure side refers to a surface of the main fin on which pressure is applied by the air flowing through the axial-flow fan, and the negative pressure side refers to a surface of the main fin opposite to the positive pressure side.

The mirrored surface may be formed by polishing the positive and negative pressure sides, or alternatively, may be formed by attaching a lustrous sticker thereon. By forming the mirrored surface on the positive and the negative pressure sides of the main fin, the air flow-separation between the air flowing through the axial-flow fan and the positive pressure side and the negative pressure side of the main fin can be reduced, thus securely preventing the turbulence and reducing the noise of the axial-flow fan.

In an exemplary embodiment of the invention, the axial-flow fan may preferably further include: a motor that drives the main shaft; a cylindrical frame that accommodates the main shaft, the main fin, the auxiliary fin and the motor, the frame having openings on the intake side and the exhaust side; and a spoke extending from an edge of the opening on the exhaust side of the frame approximately to the center of the opening to hold the motor, in which the spoke may preferably work as a guide fin that discharges an air transferred by the main fin toward the outside of the frame.

Since the spoke works as a guide fin, the air transferred by the main fin can be smoothly discharged to the outside. Accordingly, the noise generated when the air transferred by the main fin collides with the spoke can be diminished.

In the above, the spoke may preferably be curved in a direction opposite to the rotary direction of the main fin, and may preferably have a curved surface adapted to scoop up the air transferred by the main fin. Since the spoke is curved in a direction opposite to the rotary direction of the main fin and has a curved profile adapted to scoop up the air, the air transferred by the main fin flows smoothly on the spoke. Accordingly, the air can be more smoothly discharged and the noise generated by collision of the air and with spoke can be efficiently reduced.

In the above, the frame may preferably be made of metal or a resin having high thermal conductivity. When the frame is molded by a material having low thermal conductivity, since heat is not easily radiated, the coil and an IC for driving the motor may be damaged by the heat of the coil of the motor for driving the main shaft.

On the other hand, since the frame is made of metal and highly heat-conductive resin in the present invention, heat radiation can be enhanced and the coil and the IC for driving the motor is less likely to be damaged by the heat, thus improving durability of the axial-flow fan. Further, when the frame is made of metal, sufficient rigidity and accuracy of the frame can be obtained.

In an exemplary embodiment of the invention, the axial-flow fan may preferably further include: a frame that accommodates the main shaft, the main fin, the auxiliary fin and the motor for driving the main shaft, the frame having openings on the intake side and the exhaust side; and a straightening plate having tapered configuration of which diameter becomes greater toward a direction opposite to a direction for transferring the air, the straightening plate being provided on the edge of the opening of the intake side of the frame.

When the straightening plate is not provided, since the air is drawn in any direction by strong suction force of the fan, turbulence is likely to be generated and noise is easily generated. In contrast, since the tapered straightening plate is provided in the present invention, the direction of the air drawn in by the axial-flow fin can be aligned, and the noise can be reduced.

When the diameter of the straightening plate is the same as that of the opening of the frame body, since the straightening plate blocks the intake air flow, sufficient noise reduction effect cannot be obtained. In the present invention, since the straightening plate is configured in a tapered shape, the air flow is not blocked by the straightening plate, so that the noise can be sufficiently reduced.

The above axial-flow fan may preferably further include: a frame that accommodates the main shaft, the main fin, the auxiliary fin and the motor for driving the main shaft, the frame having openings on the intake side and the exhaust side; and a filter attached on the frame to cover the opening on the intake side.

Since a plurality of openings having approximately the same profile are usually formed on the filter, the air flow drawn in by the axial-flow fan can be also aligned by providing the filter on the intake opening of the frame through which the air is transferred to the axial-flow fan, thus reducing the noise.

In the above, the opening of the filter may preferably have polygonal or circular profile, and the thickness of the filter may preferably be not less than 0.1 mm and not more than 5 mm. By arranging the opening of the filter to be a polygonal or circular profile and the thickness of the filter to be not less than 0.1 mm and not more than 5 mm, the noise can be most effectively reduced.

In the above, the diameter of the opening of the filter may preferably be not less than 0.3 mm and not more than 3 mm, and the opening ratio of the filter may preferably be not less than 70% and not more than 90%. Further, a predetermined gap may preferably be secured between the filter and the opening of the frame.

When the diameter of the opening of the filter is less than 0.3 mm or the opening ratio is less than 70%, the air may not smoothly flow through the opening and the flow rate may be lowered. When the diameter of the opening is greater than 3 mm, the air flow may be difficult to be aligned. Further, when the opening ratio is more than 90%, processability of the filter may be deteriorated.

In the present invention, since the opening ratio is not less than 70% and not more than 90% and the diameter of the opening of the filter is 0.3 mm or more and 3 mm or less, the above disadvantages can be avoided. Further noise reduction is possible by retaining a predetermined gap between the opening of the frame and the filter.

In an exemplary embodiment according to this invention the axial-flow fan may preferably further include: a frame that accommodates the main shaft, the main fin, the auxiliary fin and the motor for driving the main shaft, the frame having openings on the intake side and the exhaust side; and a cylindrical cover having a louver attached thereinside, the cover being provided on the exhaust side of the frame, in which the louver may preferably include a plurality of louver components extending from the center of the cover to the periphery thereof, the louver component working as a guide fin in discharging air transferred by the main fin toward the outside of the frame.

Since the cover having a louver as a guide fin is provided on the discharge side of the frame, the flow of the discharged air can be straightened, so that the turbulence can be prevented and the noise can be reduced.

In the above, the louver component may preferably be inclined in a direction opposite to the inclining direction of the main fin. By inclining the louver component in a direction opposite to the inclining direction of the main fin, when the axial-flow fin is installed in a machine having a light source, such as a projector, the amount of light leakage through the adjoining main fins can be shielded.

The axial-flow fan according to the above aspect of the present invention may preferably have: a frame that accommodates the main shaft, the main fin, the auxiliary fin and the motor for driving the main fin, the frame having openings on the intake side and the exhaust side; and a cylindrical cover having a louver attached thereinside, the cover being provided on the exhaust side of the frame, in which the louver includes a plurality of louver components disposed approximately in parallel, and in which the space between the adjoining louver components where the light-shielding surface of the louver component is approximately orthogonal to the inclination of the main fin is broader than the space between the louver components where the light-shielding surface of the louver components is approximately parallel to the inclination of the main fin. Since the fan cover provided with the louver is attached, the flow of the discharged air can be straightened, so that turbulence can be prevented, thereby further reducing the noise.

Further, the space between the louver components where the light-shielding surface of the louver component is approximately orthogonal to the inclination of the main fin is broader than the space between the louver components where the light-shielding surface of the louver components is approximately parallel to the inclination of the main fin. By providing broad space between the louver components, loss in flow rate can be restrained and the noise can be further lowered. Since the louver components are arranged approximately in parallel, the louver components can be easily installed.

In the above, a predetermined gap may preferably be secured between the louver and the opening of the frame on the exhaust side. The gap between the louver and the opening of the frame further reduces the noise.

A projector according to another aspect of the present invention includes: an optical system including an optical modulator that modulates a light beam irradiated by a light source in accordance with image information to project the light beam in an enlarged manner to form a projection image and a fan for circulating air, in which the fan is the axial flow fan described above. Since the above axial-flow fan is provided on the projector, the same advantages as the axial-flow fan can be obtained.

BRIEF DESCRIPTION OF THE DRAWINGS

Various embodiments of this invention will be described in detail, with reference to the following figures, wherein.

DETAILED DESCRIPTION OF THE INVENTION

An embodiment of the present invention will be descried below with reference to attached drawings.

[1. Primary Arrangement of Projector]

Figure 1:
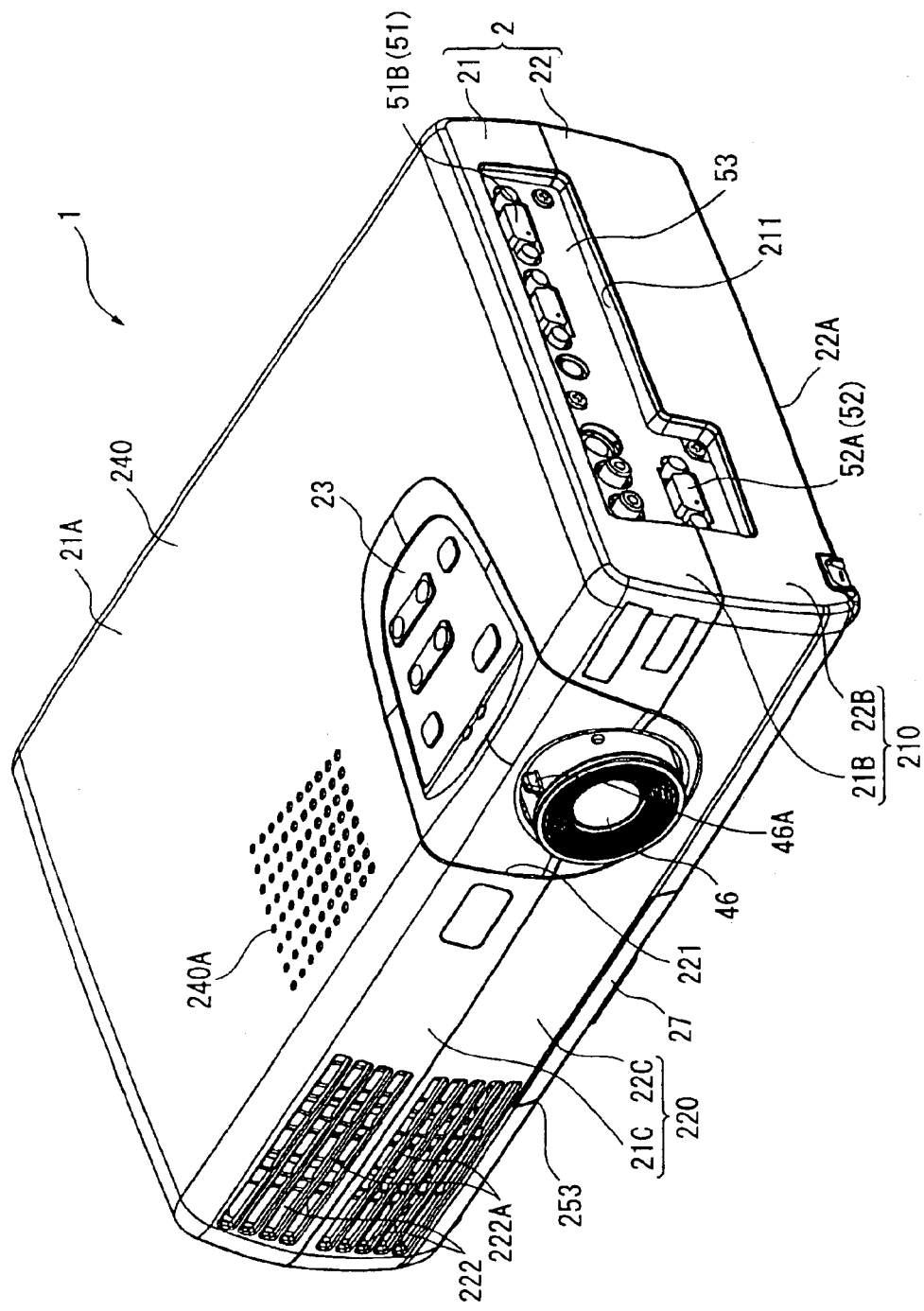
FIG. 1 is a perspective view showing a projector according to an embodiment of the present invention from upper front side thereof.
Figure 2:
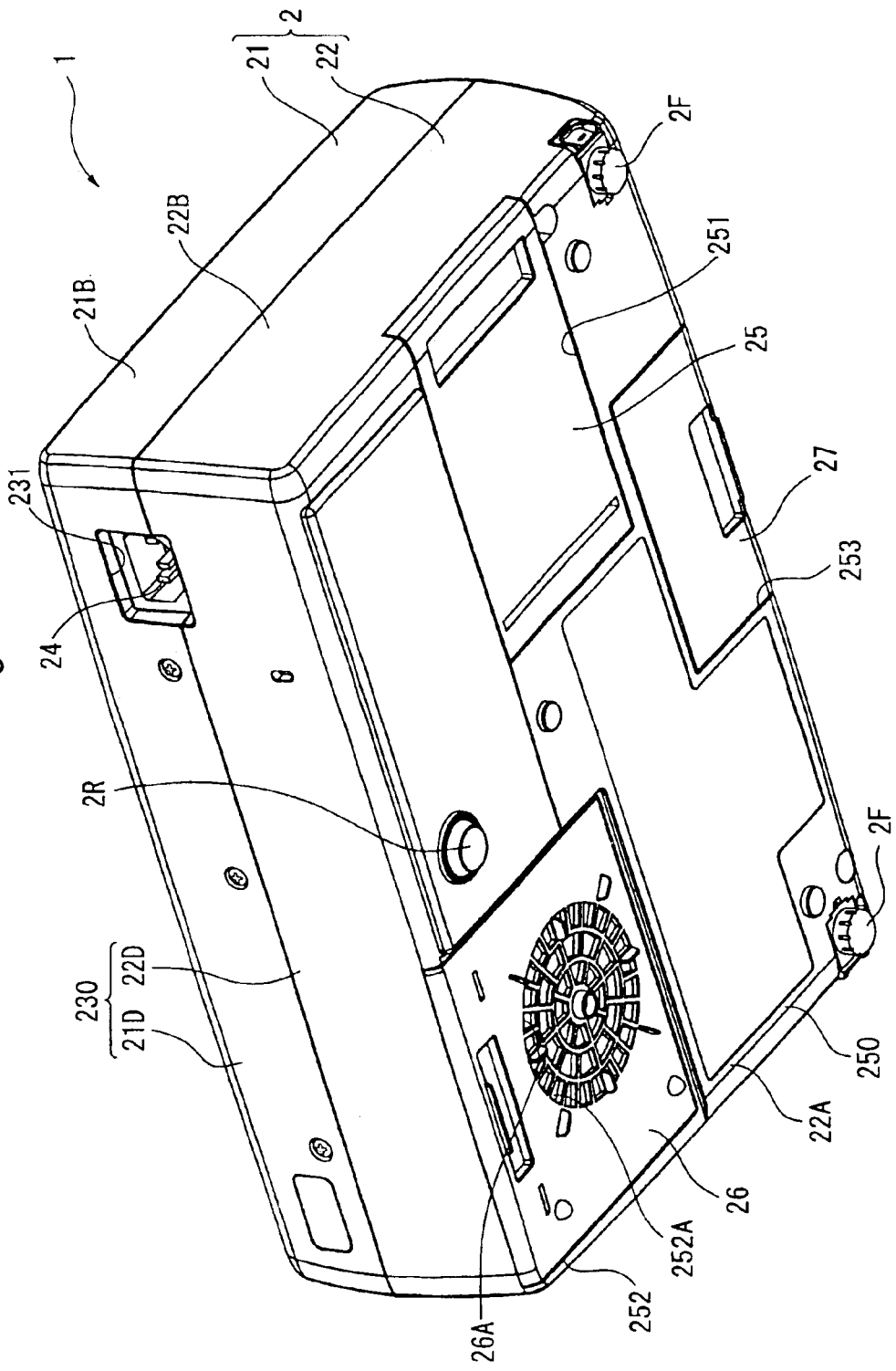
FIG. 2 is a perspective view showing the projector from lower rear side thereof.

FIG. 1 is a perspective view of a projector 1 seen from an upper front side according to an aspect of the present invention. FIG. 2 is a perspective view of the projector 1 seen from a lower rear side.

As shown in FIGS. 1 and 2, the projector 1 has an approximately rectangular parallelepiped exterior case 2 made by injection molding. The exterior case 2 is a casing for housing a body of the projector 1, which includes an upper case 21 and a lower case 22, the cases 21 and 22 being attachable and detachable.

As shown in FIGS. 1 and 2, the upper case 21 includes an upper portion 21A, a lateral portion 21B, a front portion 21C and a rear portion 21D, respectively constituting the upper side, lateral side, front side and rear side of the projector 1.

In the same manner, the lower case 22 includes a lower portion 22A, a lateral portion 22B, a front portion 22C and a rear portion 22D, respectively constituting the lower side, lateral side, front side and rear side of the projector 1.

Accordingly, as shown in FIGS. 1 and 2, the lateral sides 21B and 22B of the upper case 21 and the lower case 22 are continuously connected to form a lateral surface 210 of the rectangular parallelepiped exterior case 2. Similarly, the front portions 21C and 22C are connected to form a front surface 220, the rear portions 21D and 22D are connected to form a rear surface 230, the upper portion 21A forms an upper surface 240 and the lower portion 22A forms a lower surface 250.

As shown in FIG. 1, an operation panel 23 is provided on the front side of the upper surface 240, and a sound-outputting speaker hole 240A is formed around the operation panel 23.

An opening 211 spanning over the two lateral portions 21B and 22B is formed on the lateral surface 210 on the right side, as seen from the front side. A below-described main board 51 and an interface board 52 are provided in the exterior case 2 and a connector 51B installed on the main board 51 and a connector 52A installed on the interface board 52 are exposed to the outside through an interface panel 53 attached to the opening 211. Exterior electronics, etc. are connected to the projector through the connectors 51B and 52A.

A circular opening 221 spanning between two front portions 21C and 22C is formed around the operation panel 23 on the right side of the front 220, as seen from the front side. A projection lens 46 is disposed inside the exterior case 2 corresponding to the opening 221. At this time, a distal end of the projection lens 46 is exposed to the outside from the opening 221 and the focusing operation of the projection lens 46 can be manually conducted through a lever 46A disposed on a part of the exposed portion.

An exhaust hole 222 is formed on the front surface 220 opposite to the opening 221. A safety cover 222A is formed on the exhaust hole 222.

As shown in FIG. 2, a rectangular opening 231 is formed on the right side of the rear surface 230, as seen from backside. An inlet connector 24 is exposed through the opening 231.

A rectangular opening 251 is formed at the center of the right end of the lower surface 250 seen from the bottom side. A lamp cover 25 covering the opening 251 is detachably attached to the opening 251. A non-illustrated light source lamp can be easily exchanged by detaching the lamp cover 25.

A rectangular surface 252 indented inwardly is formed on the rear left corner of the lower surface 250 seen from bottom side. An intake 252A for drawing in cooling air from the outside is formed on the rectangular surface 252. An intake cover 26 covering the rectangular surface 252 is detachably provided on the rectangular surface 252. An opening 26A corresponding to the intake 252A is formed on the intake cover 26. An air filter (not shown) is provided on the opening 26A to prevent the invasion of dust into the interior of the casing.

A rear leg 2R constituting one of the legs of the projector 1 is formed approximately at the center on the rear side of the lower surface 250. Further, front legs 2F, also constituting the legs of the projector 1, are respectively provided on the right and left corners on the front side of the lower surface 250. In other words, the projector 1 is supported on three points by the rear leg 2R and the two front legs 2F.

The two front legs 2F are capable of vertical advancement and retraction, so that the inclination (attitude) of the projector 1 in a front and a back direction and a right and a left direction can be adjusted to adjust the position of the projection image.

Further, as shown in FIGS. 1 and 2, a rectangular parallelepiped recess 253 is formed approximately at the center of the front side of the exterior case 2 spanning over the lower surface 250 and the front surface 220. A fan cover 27 covering the lower side and front side of the recess 253 and slidable in a front and a back direction is provided on the recess 253. A remote controller (not shown) for remotely controlling the projector 1 is housed in the recess 253 covered by the fan cover 27.

Figure 3:
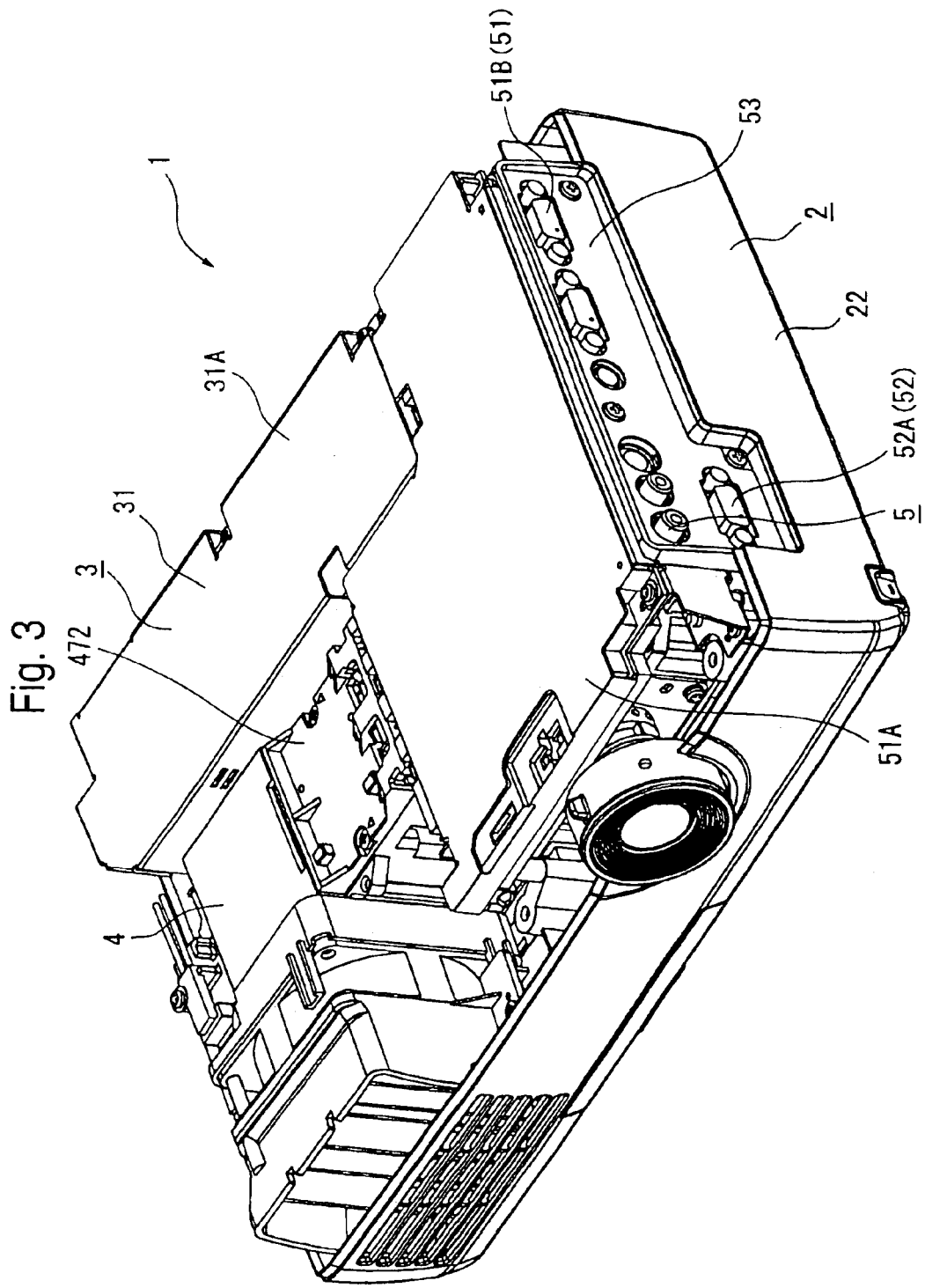
FIG. 3 is a perspective view showing the interior of the projector, which specifically shows the projector shown in FIG. 1 with an upper case thereof being detached.
Figure 4:
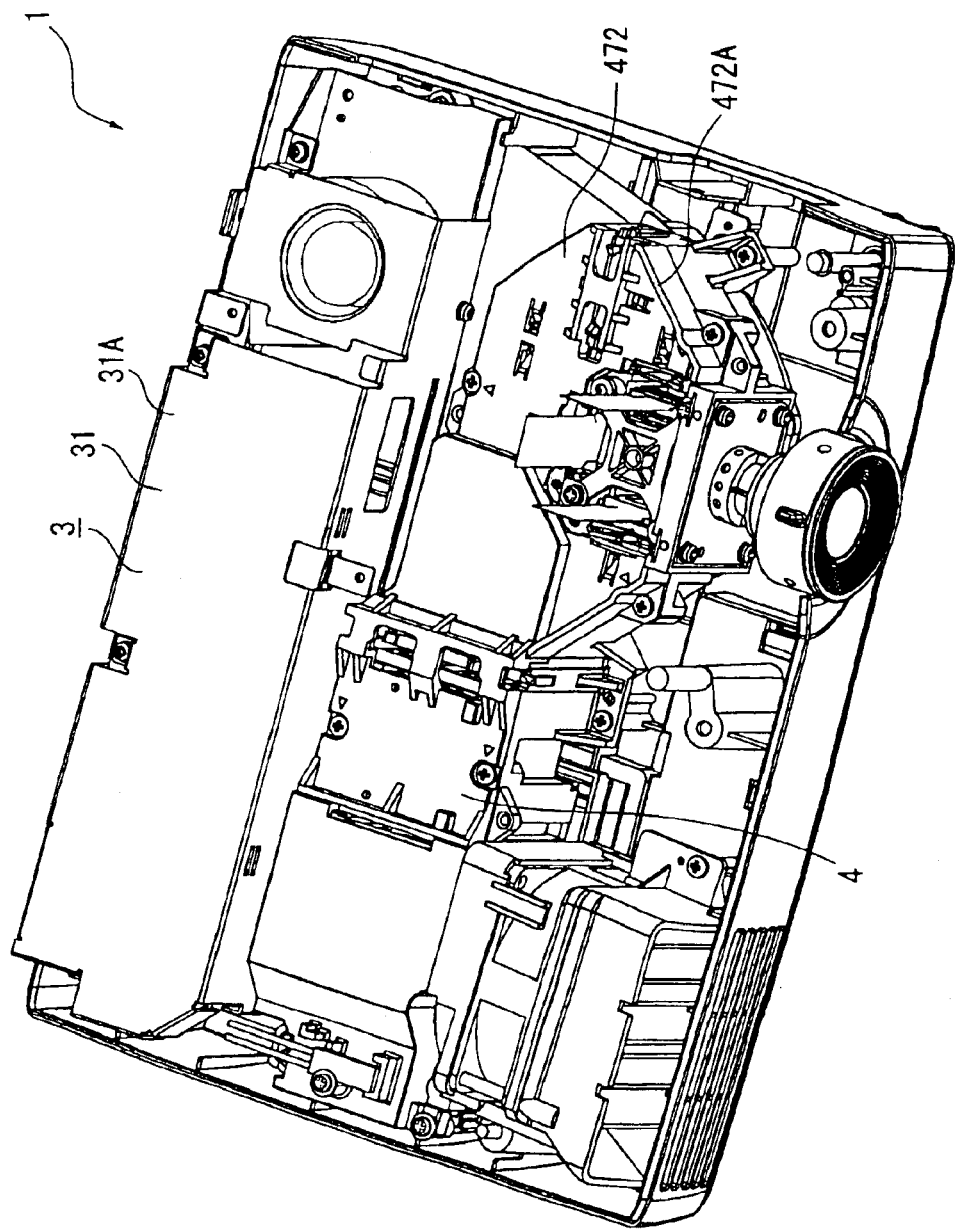
FIG. 4 is a perspective view showing the interior of the projector, which specifically shows the projector shown in FIG. 3 with a control board thereof being detached.

FIGS. 3 and 4 are perspective views showing the interior of the projector 1. Specifically, FIG. 3 is an illustration in which the upper case 21 of the projector 1 is removed from FIG. 1. FIG. 4 is an illustration with a control board 5 being removed from FIG. 3.

As shown in FIGS. 3 and 4, the exterior case 2 has a power source unit 3 disposed along the rear side and extending in a right and a left direction, an optical unit 4 disposed on the front side of the power source unit 3 as a planarly-viewed L-shaped optical system, and the control board 5 as a controller disposed on the upper right side of the units 3 and 4. The components 3 to 5 constitute the primary portion of the projector 1.

The power source unit 3 has a power source 31 and a lamp driving circuit i.e., ballast (not shown) disposed below the power source 31.

The power source 31 supplies electric power from the outside to the lamp driving circuit, the circuit board 5, and the like, through a power cable (not shown) connected to the inlet connector.

The lamp driving circuit supplies electric power fed by the power source 31 to a light source lamp (not shown in FIGS. 3 and 4) of the optical unit 4, which is electrically connected to the light source lamp. The lamp driving circuit is, for instance, constructed by wiring on a board.

The power source 31 and the lamp driving circuit are vertically arranged approximately in parallel, which occupy the space extending in a right and a left direction on the rear side of the projector 1.

The surroundings of the power source 31 and the lamp driving circuit are covered with a metal shield 31A, such as aluminum, with right and left sides thereof being opened. The shield 31A works as a duct for guiding the cooling air and prevents leakage of the electromagnetic noise generated by the power source 31 and the lamp driving circuit toward the outside.

As shown in FIG. 3, the control board 5 is disposed to cover the upper side of the units 3 and 4, which includes the main board 51 including a CPU and the connector 51B and the interface board 52 disposed below the main board 51 and including the connector 52A.

In the control board 5, the CPU on the main board 51 controls a liquid crystal panel of the below-described optical device in accordance with the image information inputted through the connectors 51B and 52A.

The surroundings of the main board 51 are covered with a metal shield 51A. Though not clearly shown in FIG. 3, the main board 51 abuts to an upper end 472A (FIG. 4) of an upper inner case 472 of the optical unit 4.

[2. Detailed Construction of Optical Unit]

Figure 5:
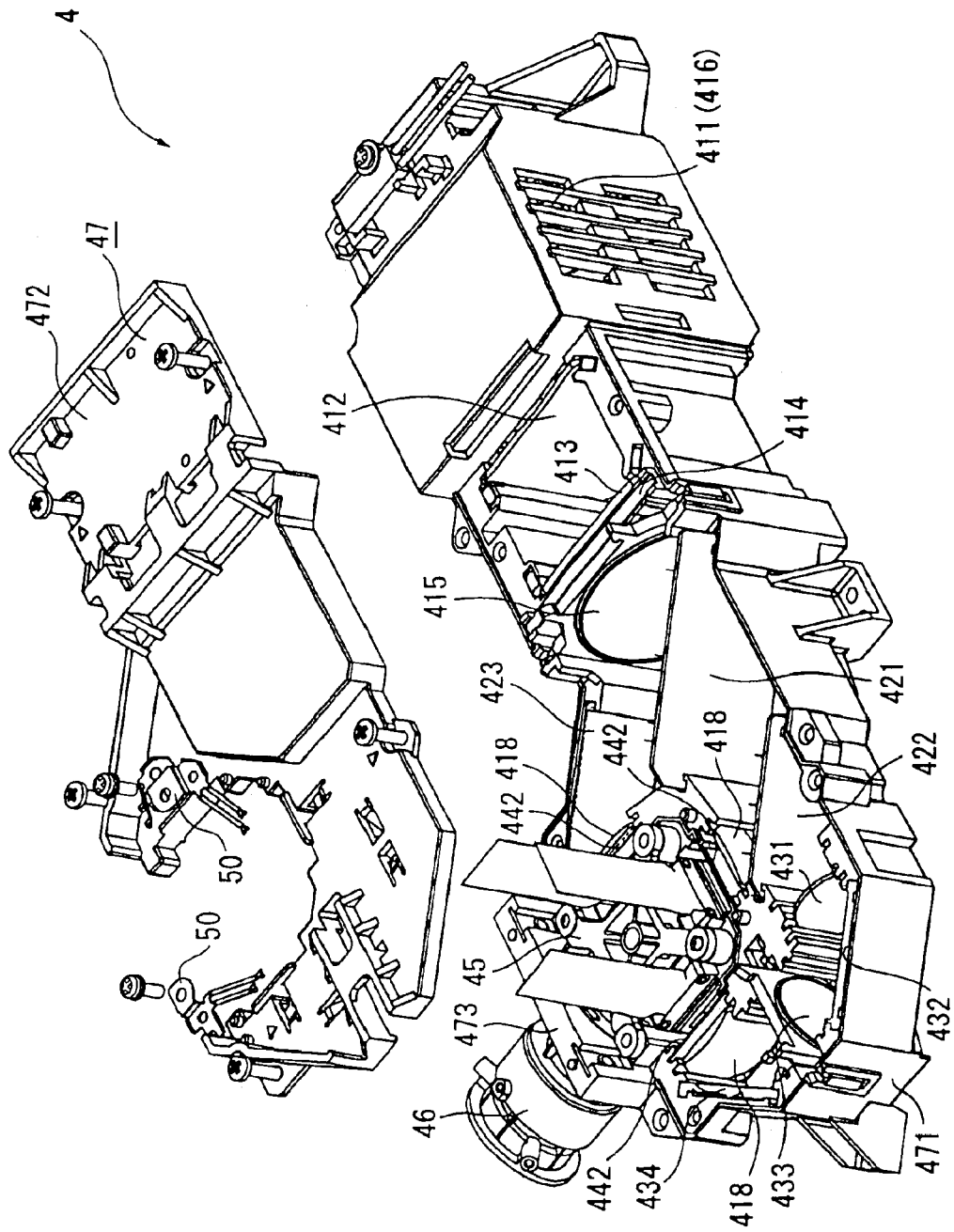
FIG. 5 is an exploded perspective view showing an optical unit of the projector.
Figure 6:
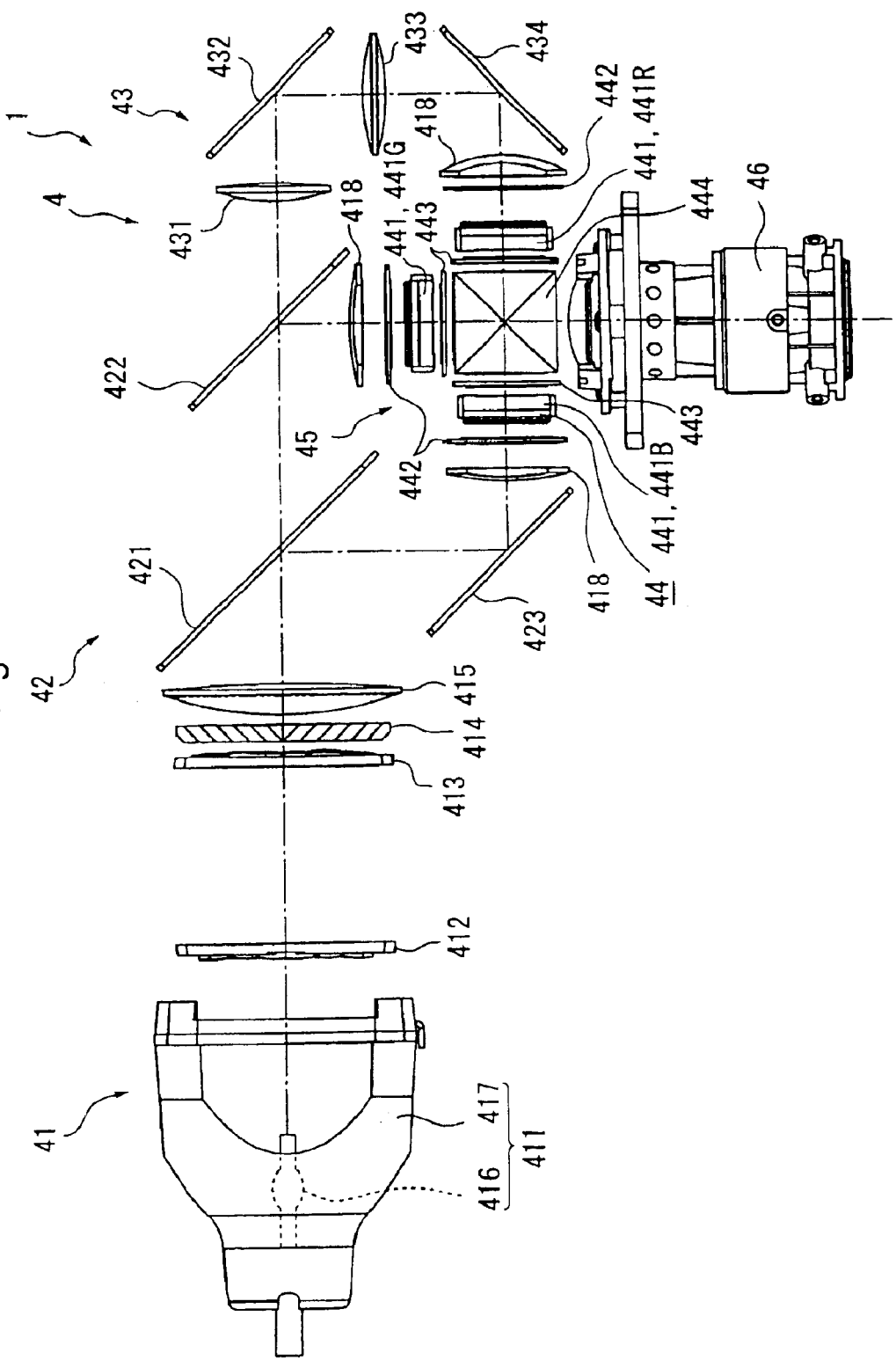
FIG. 6 is a schematic illustration showing the optical unit.

FIG. 5 is an exploded perspective view showing the optical unit 4. FIG. 6 is a schematic illustration of the optical unit 4.

As shown in FIG. 6, the optical unit 4 is a unit for optically processing the light beam irradiated by a light source lamp 416 of a light source 411 to form an optical image corresponding to the image information and project the optical image in an enlarged manner. The optical unit 4 includes an integrator illuminating optical system 41, a color separating optical system 42, a relay optical system 43, an optical device 44, the projection lens 46 as a projection optical system, and an inner case 47 made of synthetic resin for housing the optical components 41 to 44 and 46 (FIG. 5).

The integrator illuminating optical system 41 is a system for substantially uniformly illuminating the image formation area of the three liquid crystal panels 441 of the optical device 44 (respectively referred to as liquid crystal panel 441R, 441G and 441B for each color light of red, green and blue), which includes the light source 411, a first lens array 412, a second lens array 413, a polarization converter 414 and a superposing lens 415.

The light source 411 has the light source lamp 416 as a radiation light source and a reflector 417, which converts the radial light beam irradiated by the light source lamp 416 into a parallel light beam by the reflector 417 to emit the parallel light beam toward the outside. A high-pressure mercury lamp is used as the light source lamp 416. A metal halide lamp and a halogen lamp, or the like, may be used instead of the high-pressure mercury lamp. A parabolic mirror is used as the reflector 417. A combination of concave lens for parallelizing the light beam and ellipsoidal mirror may be used instead of the parabolic mirror.

The first lens array 412 has a plurality of small lenses arranged in a matrix, the lenses having substantially rectangular profile, as viewed from optical axis direction. The respective lenses split the beam emitted by the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412 where the small lenses are disposed in a matrix. The second lens array 413, as well as the superposing lens 415, superposes the image from the respective small lenses of the first lens array 412 onto the liquid crystal panel 441.

The polarization converter 414 is disposed between the second lens array 413 and the superposing lens 415. The polarization converter 414 converts the light from the second lens array 413 to uniform polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted by the light source lamp 416 is converted into single polarized light to enhance light utilization efficiency in the optical device 44. Incidentally, such polarization converter 414 is disclosed in, for instance, Japanese Patent Laid-Open Publication No. H08-304739.

The color separating optical system 42 has two dichroic mirrors 421 and 422 and a reflection mirror 423. The dichroic mirrors 421 and 422 separate the plurality of sub-beams irradiated by the integrator illuminating optical system 41 into three color lights of red (R), green (G) and blue (B).

The relay optical system 43 has an incident-side lens 431, a relay lens 43 and reflection mirrors 432 and 434, and introduces the red light separated by the color separating optical system 42 onto the liquid crystal panel 441R.

At this time, the red light component and the green light component of the light beam irradiated from the integrator illuminating optical system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided on the incident-side of the other liquid crystal panels 441G and 441R function in a similar manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red light in order to prevent a decrease in utilization efficiency of light on account of light diffusion caused by the longer length of the optical path of the red light than the length of the optical path of the other color lights, in other words, in order to directly transmit the sub-beam incident on the incident-side lens 431 to the field lens 418. Incidentally, though the red light passes through the relay optical system 43, blue light may pass through the relay optical system 43 instead of red light.

The optical device 44 for modulating the incident light beam in accordance with image information to form a color image, has three incident-side polarization plates 442 on which the respective color lights separated by the color separating optical system 42 are incident, the liquid crystal panels 441R, 441G and 441B disposed on the downstream of the respective incident-side polarization plates 442 as optical modulators, an irradiation-side polarization plate 443 disposed on the downstream of the respective liquid crystal panels 441R, 441G and 441B, and a cross dichroic prism 444 as a color combining optical system. The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image. The incident-side polarization plate 442 transmits only a polarized light of a predetermined direction among the respective color lights separated by the color separating optical system 42 and absorbs the other light beam, which is constructed by forming a polarization film on a substrate of sapphire glass, or the like. Incidentally, a polarization film may be formed on the field lens 418 without employing the substrate.

The irradiation-side polarization plate 443 is constructed approximately in the same manner as the incident-side polarization plate 442, which transmits only a polarized light of a predetermined direction among the light beams irradiated by the liquid crystal panels 441 (441R, 441G and 441B) and absorbs the other light beams. Incidentally, a polarization film may be formed on the cross dichroic prism 444 without employing substrate.

The polarization axes of the incident-side polarization plate 442 and the irradiation-side polarization plate 443 are set orthogonal with each other. The cross dichroic prism 444 combines the optical image irradiated by the irradiation-side polarization plate 443 and modulated for respective color lights to form a color image.

A dielectric multi-layer film for reflecting red light and a dielectric multi-layer film for reflecting blue light are formed along the boundaries of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit in an optical device body 45.

Figure 7:
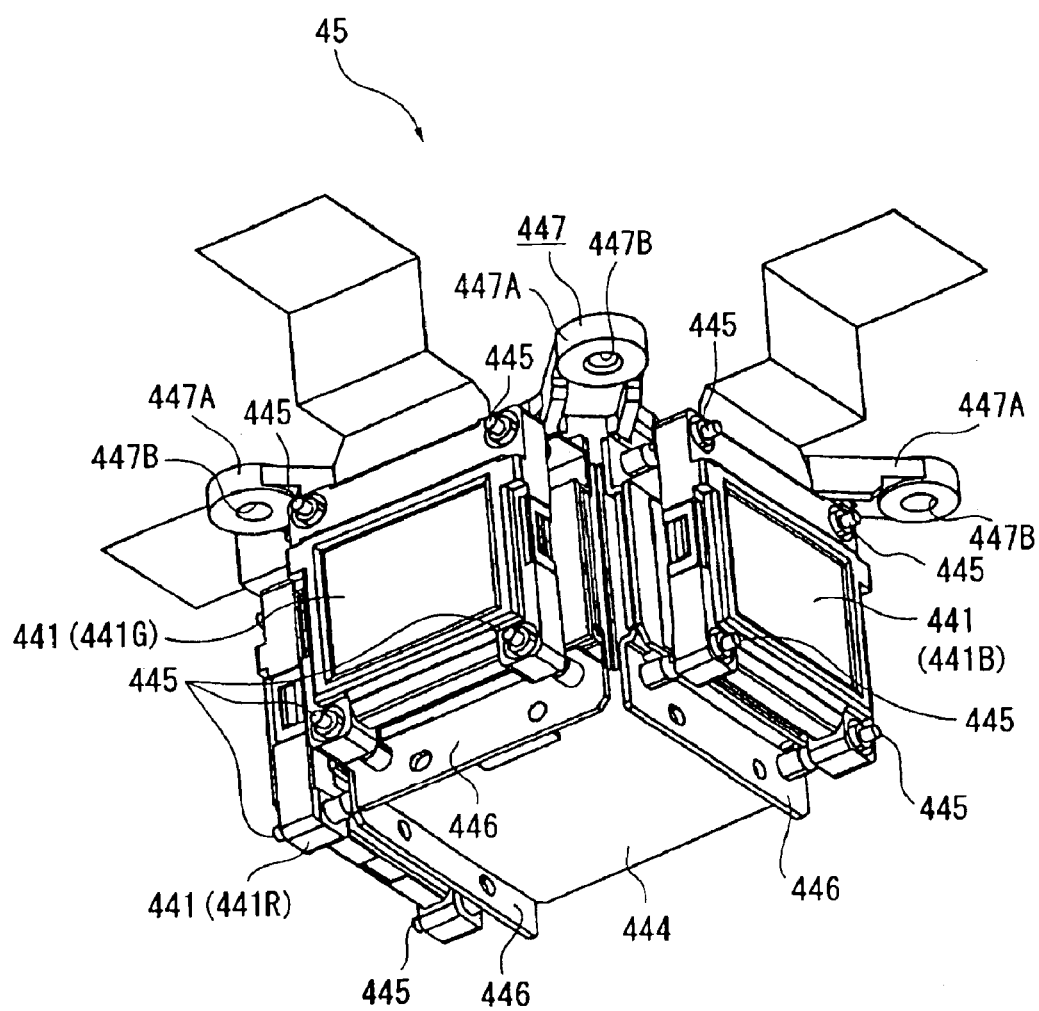
FIG. 7 is a perspective view showing an optical device body of the optical unit.

FIG. 7 is a perspective view showing the optical device body 45. As shown in FIG. 7, the optical device body 45 has the cross dichroic prism 444, a fixing plate 447 made of synthetic resin and fixed on the upper side of the cross dichroic prism 444, a metal holding plate 446 attached to the light-incident side of the cross dichroic prism 444 for holding the irradiation-side polarization plate 443, and the liquid crystal panels 441 (441R, 441G and 441G) held by four pins 445 made of transparent resin attached to the light-incident side of the holding plate 446.

A predetermined gap is secured between the holding plate 446 and the liquid crystal panel 441, so that the cooling air can flow through the gap. The optical device body 45 is screwed to the lower inner case 471 through a circular hole 447B of four arms 447A formed on the fixing plate 447. The projection lens 46 enlarges and projects the color image combined by the cross dichroic prism 444 of the optical device 44.

As shown in FIG. 5, the inner case 47 has the lower inner case 471 having a groove on which the optical components 412 to 415, 418, 421 to 423, 431 to 434 and 442 are slidably fitted from the above, and a lid-shaped upper inner case 472 for closing the upper opening of the lower inner case 471. The light source 411 is housed on a side of the lower inner case 471 of approximately planarly-viewed L-shape. The projection lens 46 is screwed to the other end of the lower inner case 471 through a head component 473 formed on the lower inner case 471. The optical device body 45 housed in the lower inner case 471 is screwed to the lower inner case 471 with two springs 50 being sandwiched. The two springs 50 bias the field lens 418 and the incident-side polarization plate 442 toward lower side to fix the position thereof.

[3. Cooling Mechanism]

Figure 8:
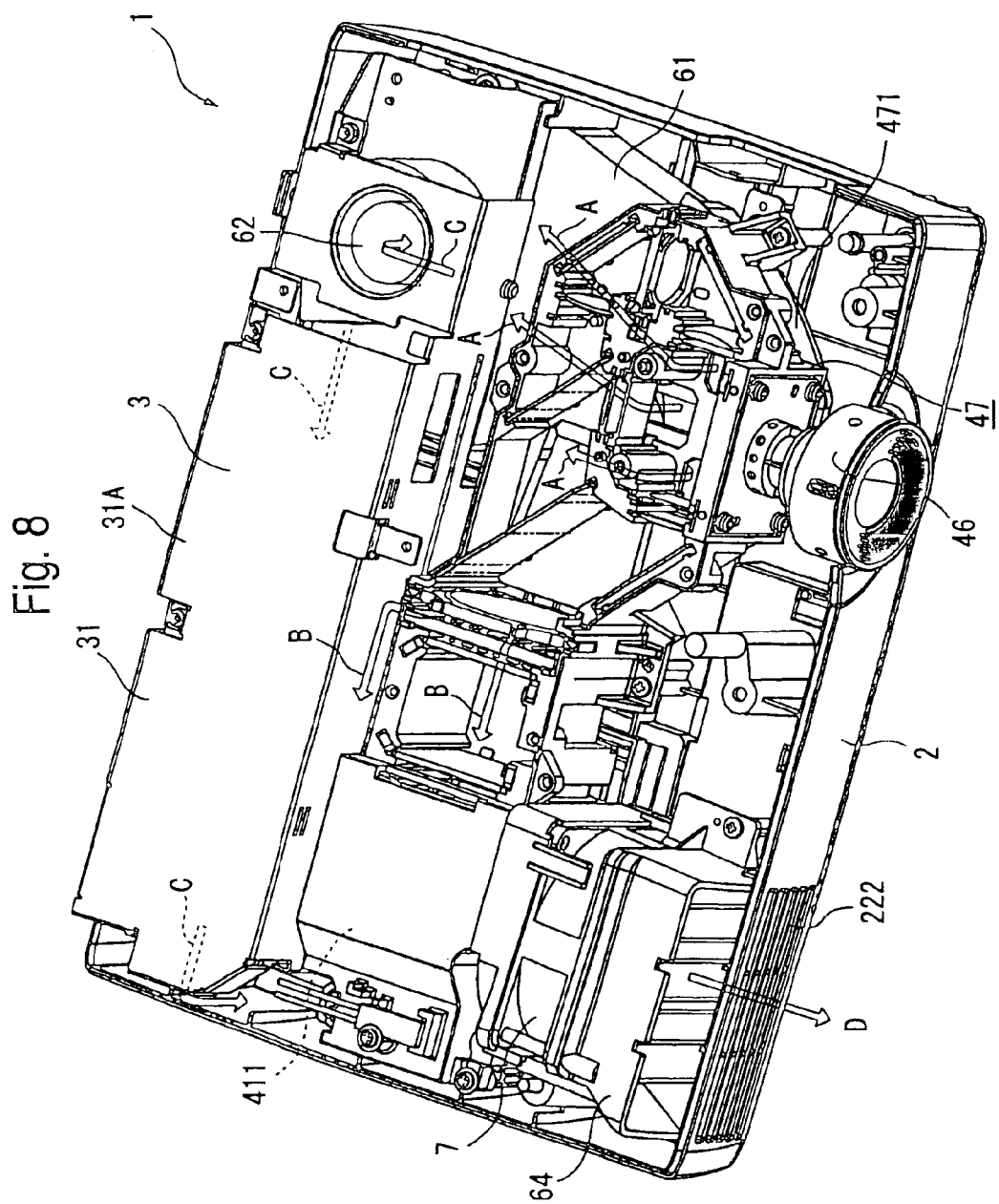
FIG. 8 is a perspective view showing a cooling system inside the projector, which specifically shows the projector shown in FIG. 4 with an upper light guide and the optical device body being detached to expose the cooling system.
Figure 9:
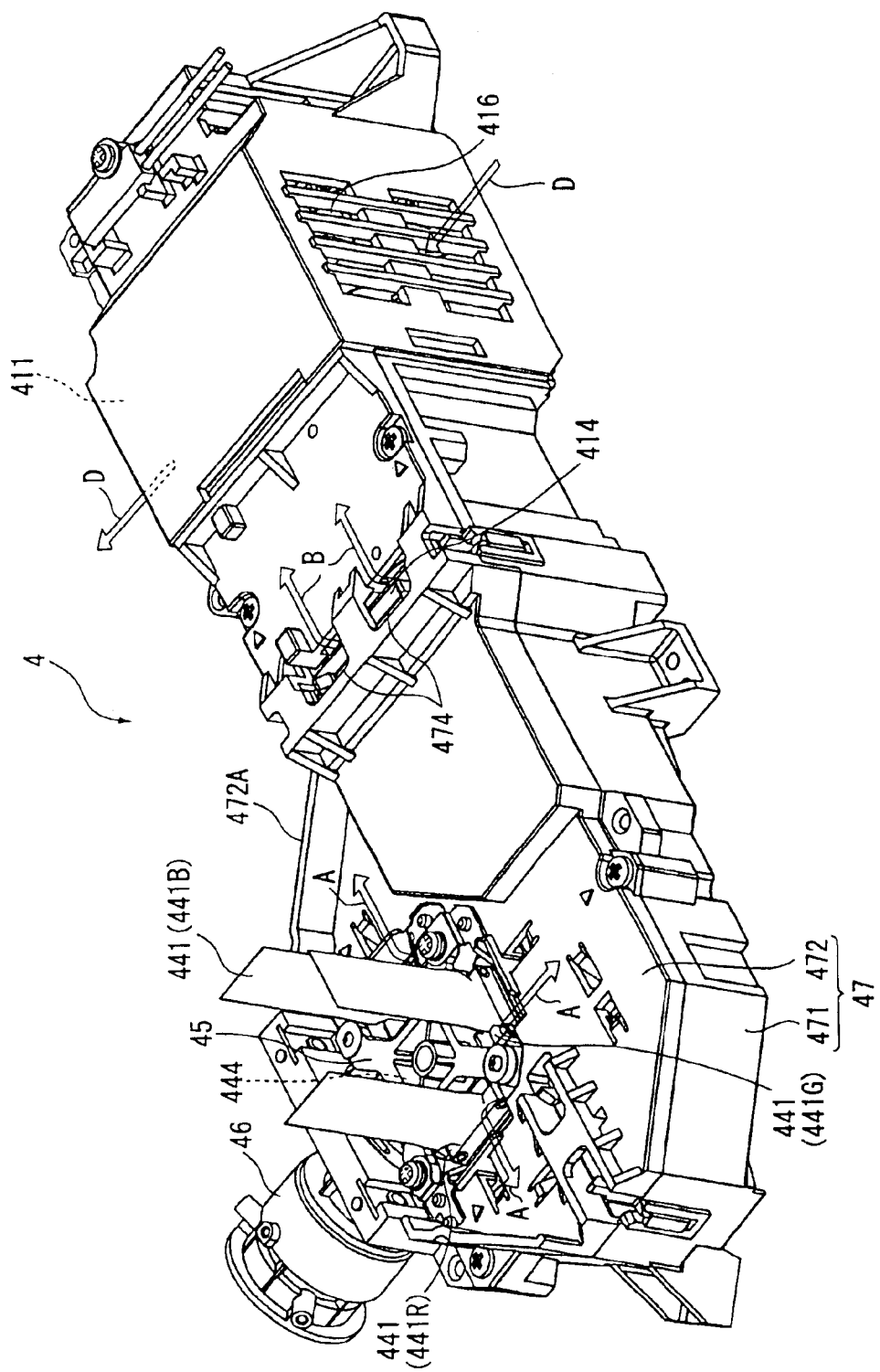
FIG. 9 is a perspective view showing a cooling system of the optical unit.

FIG. 8 is an illustration where the upper inner case and the optical device body 45 are removed from FIG. 4. FIG. 9 is a perspective view showing the optical unit 4.

As shown in FIGS. 8 and 9, the projector 1 has a panel cooling system A mainly for cooling the liquid crystal panel 441, a polarization converter cooling system B mainly for cooling the polarization converter 414, a power source cooling system C mainly for cooling the power source unit 3, and a light source cooling system D mainly for cooling the light source 411. As shown in FIG. 8, a large sirocco fan 61 disposed on the lower side of the power source unit 3 is used in the panel cooling system A.

In the panel cooling system A, as shown in FIGS. 8 and 9, the outside cooling air introduced from the intake 252A (FIG. 2) formed on the lower surface 250 of the exterior case 2 is guided to the lower side of the optical device body 45 by the sirocco fan 61 through a duct (not shown). The air enters into the inner case 47 from the intake formed on the lower side of the respective liquid crystal panels 441 of the lower inner case 471. As shown in FIG. 9, the cooling air passes through the gap between the respective liquid crystal panels 441R, 441G and 441B and the cross dichroic prism 444 to cool the liquid crystal panel 441 and the irradiation-side polarization plate to be discharged to the space between the upper inner case 472 and the control board. Further, the cooling air passes through the gap between the respective liquid crystal panels 441R, 441G and 441B and the field lens 418 to cool the liquid crystal panel 441 and the incident-side polarization to be discharged to the space between the upper inner case 472 and the incident-side polarization plate. Incidentally, the air discharged to the spaces is prevented from flowing toward the projection lens 46 by the contact of the upper end 472A of the upper inner case 472 with the control board 5.

In the polarization converter cooling system B, the cooling air drawn in by the sirocco fan 61 is introduced to the lower side of the polarization converter 414 by a duct (not shown) disposed on the lower side of the lower inner case 471. The air enters into the inner case 47 from the intake formed on the lower side of the polarization converter 414 of the lower inner case 471 to cool the polarization converter 414 to be discharged from an exhaust hole 474 formed on the upper inner case 472.

A small sirocco fan 62 disposed on the upper side of the sirocco fan 61 sandwiching a metal plate is used in the power source cooling system C as shown in FIG. 8. In the power source cooling system C, the cooling air flowing into the space between the upper inner case 472 and the control board 5 by the panel cooling system A is drawn in by the sirocco fan 62 while cooling the control board 5 to be discharged into the power source unit 3. The air discharged into the power source unit 3 flows along the shield 31A to cool the power source 31 and the lamp driving circuit to be discharged from an opening opposite to the sirocco fan 62.

The light source cooling system D uses an axial-flow fan 7 disposed on the front side of the light source 411 and a duct 64 attached to the axial-flow fan 7. In the light source cooling system D, the air discharged by the power source cooling system C and the polarization converter cooling system B enters into the light source 411 from the slit-shaped opening formed on the lateral side of the light source 411 being drawn by the axial-flow fan 7 to cool the light source lamp 416. The air is discharged from the exhaust hole 222 of the exterior case 2 toward the outside through the duct 64.

[4. Structure of Axial-Flow Fan]

Figure 10:
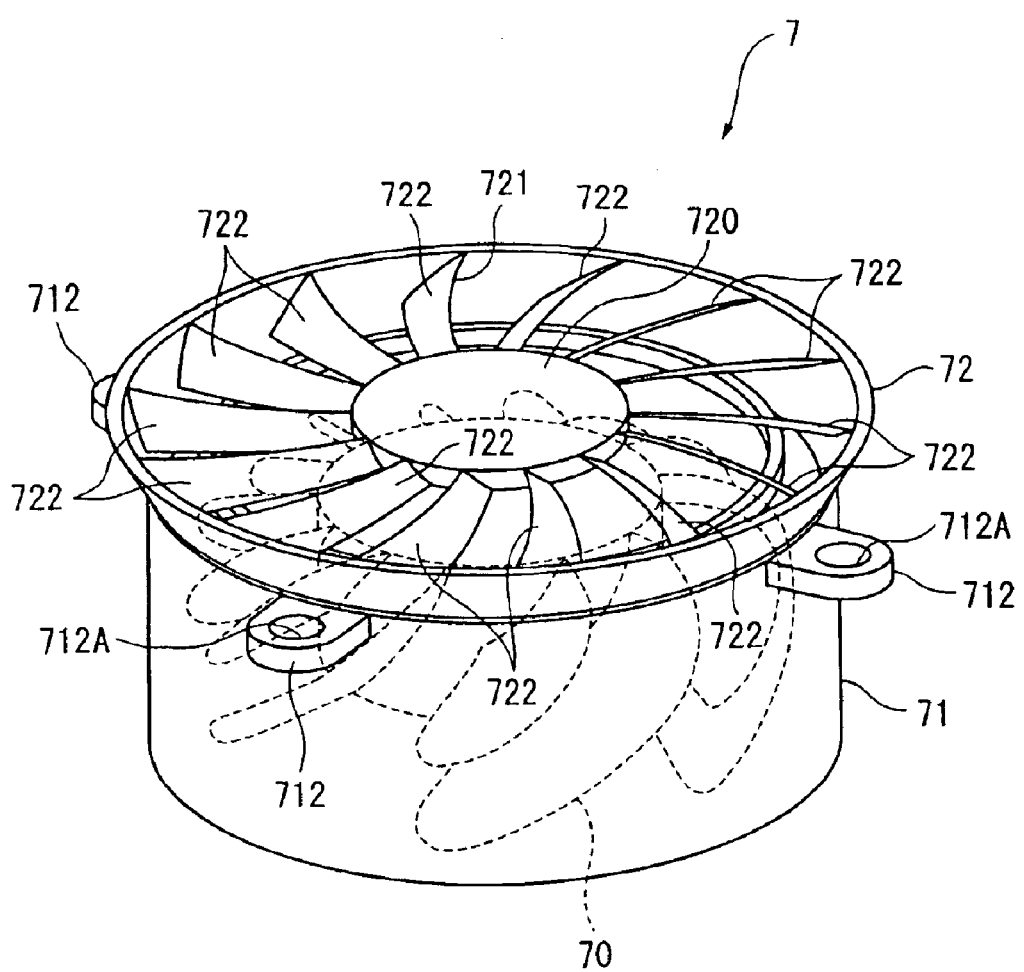
FIG. 10 is a perspective view showing an axial-flow fan.
Figure 11:
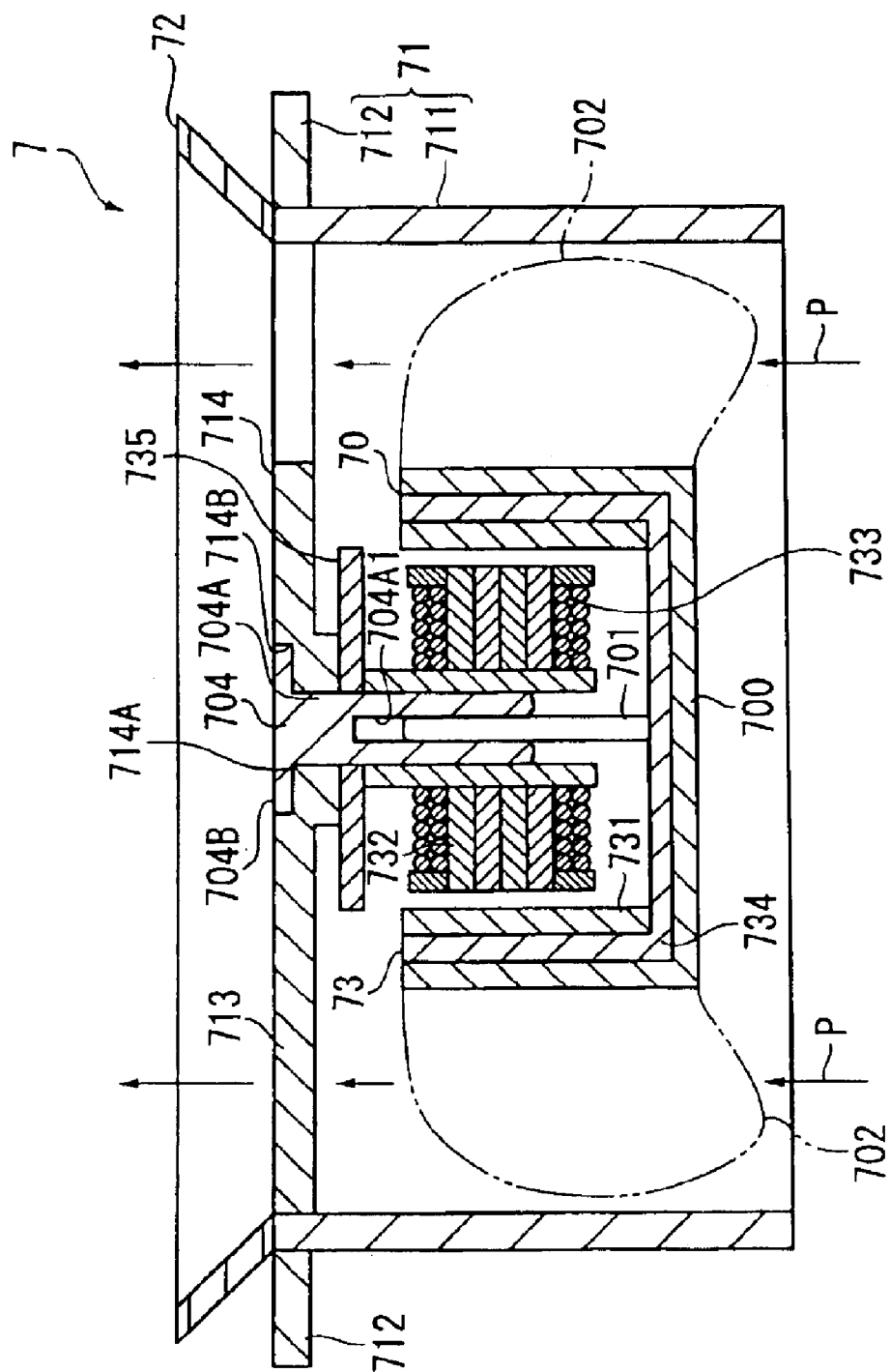
FIG. 11 is a cross section showing the axial-flow fan.
Figure 12:
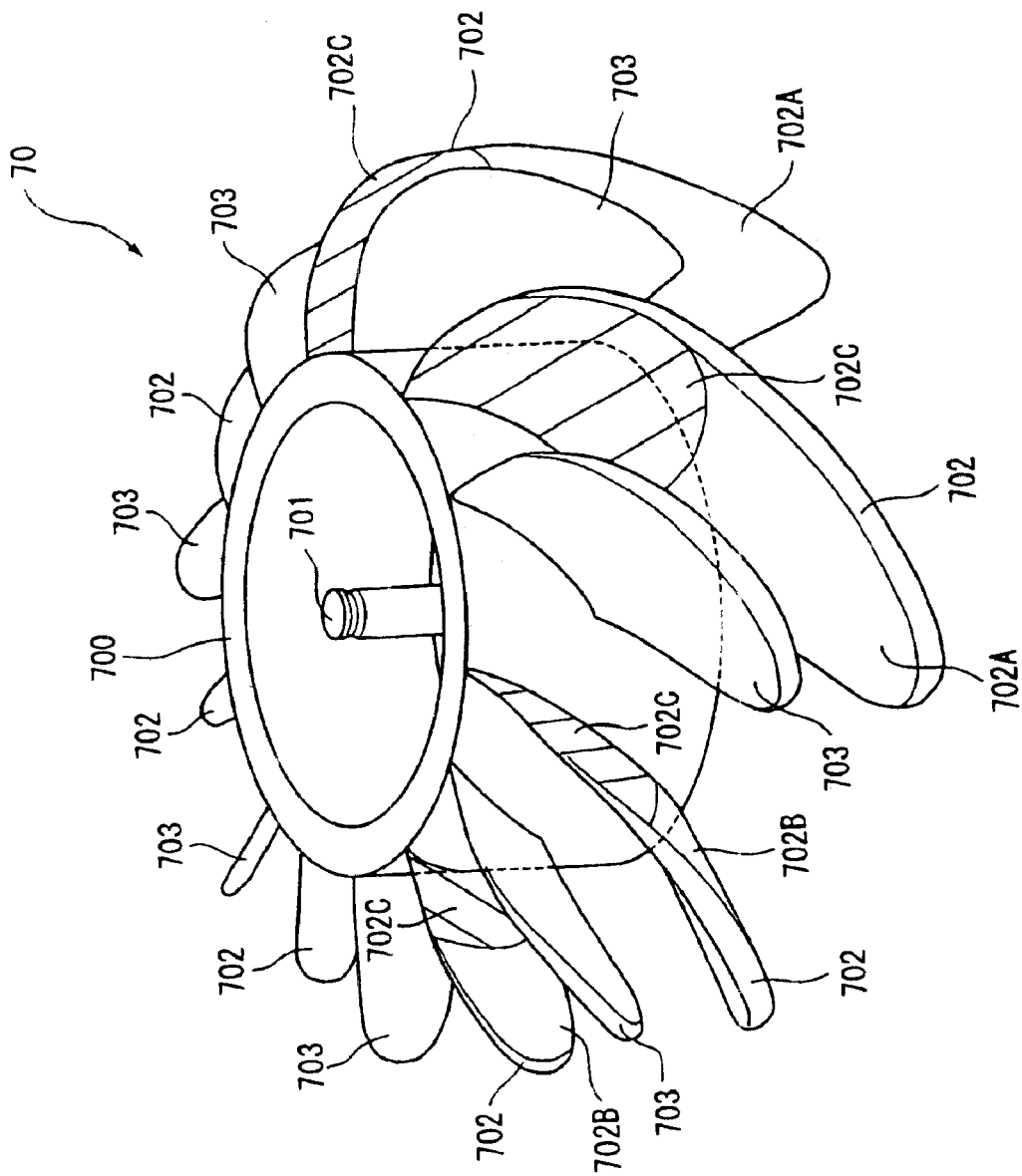
FIG. 12 is a perspective view showing the body of the axial-flow fan.

FIGS. 10 through 12 show the axial-flow fan 7. The axial-flow fan 7 has an axial-flow fan body 70, a frame 71 for housing the axial-flow fan body 70, and a cover 72 attached to the frame 71.

As shown in FIGS. 11 and 12, the axial-flow fan body 70 has a main shaft 701, a casing 700, a plurality of (e.g. seven)

main fins 702 attached on the outer circumference of the main shaft 701 through the casing 700, auxiliary fins 703 disposed between the respective main fins 702, and a motor 73 for driving the main shaft 701.

The casing 700 is a cylinder with one side thereof being opened, in which the main shaft 701 and the motor 73 are accommodated. The motor 73 has a cylindrical stator 734 provided on the inside of the casing 700, a magnet 731 fixed on the inner circumference of the stator 734, a magnet 732 opposing the magnet 731 and a substrate 735. A coil 733 is wound around the magnet 732. An IC and other devices (not shown) are installed on the substrate 735 to control the electric current flowing in the coil 733.

The tip end of the main shaft 701 is fixed to the inside of the stator 734 to support the stator 734 and the casing 700. A fluid dynamic bearing 704 rotatably supports the main shaft 701, which includes a cylindrical body 704A having a bearing hole 704A1 for the main shaft 701 to be inserted and a base 704B formed on the body 704A. A fluid as a lubricant is injected into the bearing hole 704A1 of the body 704A.

Figure 14:
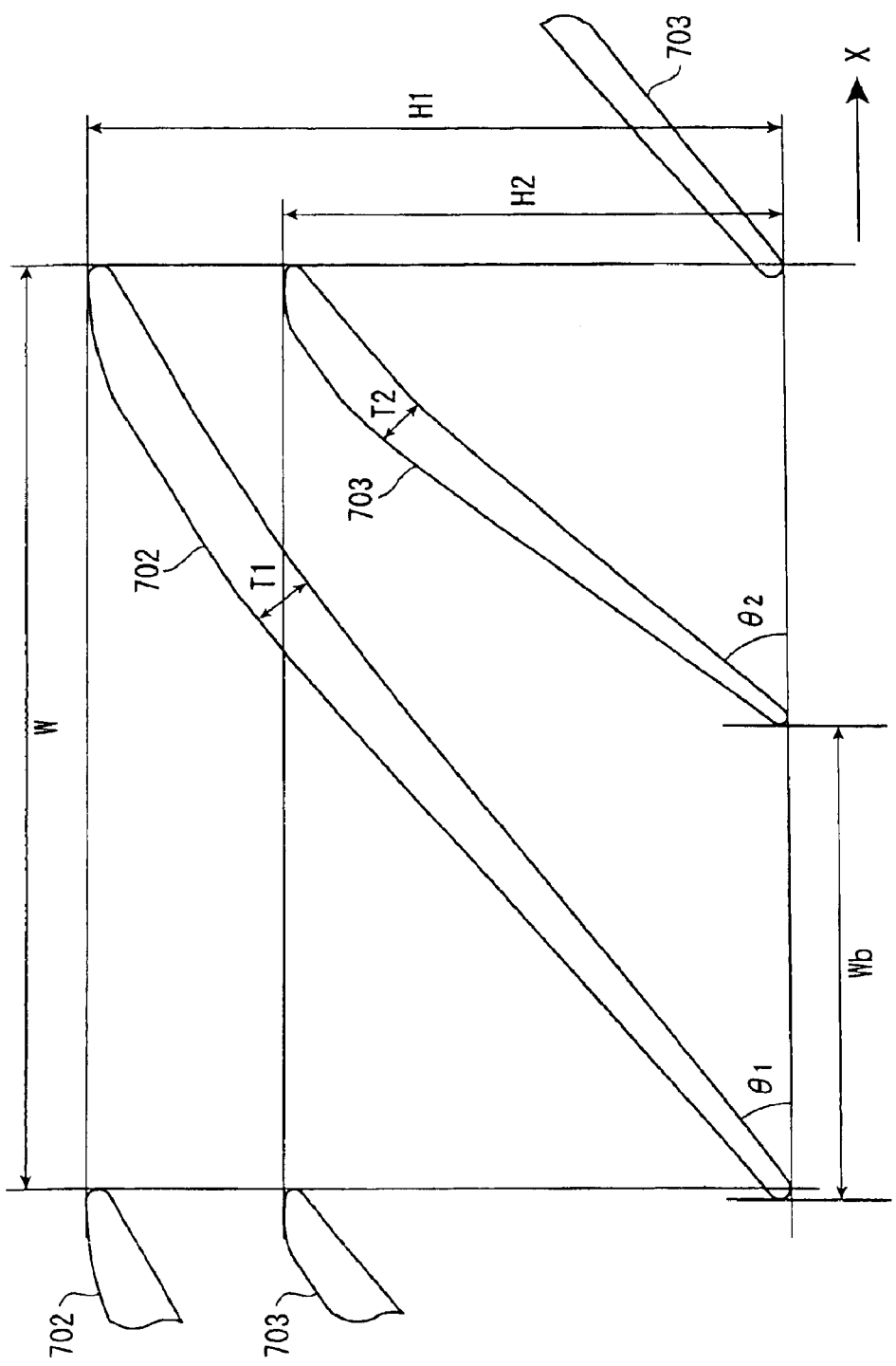
FIG. 14 is a development elevational view showing the body of the axial-flow fan.

The main fin 702 and the auxiliary fin 703 are inclined relative to axial direction of the main shaft 701. As shown in FIG. 14, when the attachment angle of the auxiliary fin 703 relative to the main shaft 701 is defined as $\theta_2$ and the attachment angle of the main fin 702 relative to the main shaft 701 is defined as $\theta_1$, $\theta_2$ is not less than $\theta_1 - 10°$ and not more than $\theta_1 + 5°$, preferably $\theta_2 = \theta_1 + 5°$. The cross section of the main fin 702 along the main shaft 701 is arranged in a streamline. Incidentally, when the main shaft 701 is driven, the air flows in the direction of arrow P in FIG. 11, so that the front end in the rotary direction of the main fin 702 is located on the intake side and the rear end thereof in the rotary direction is located on the exhaust side.

As shown in FIG. 12, a mirrored surface 702C is formed on a positive pressure side (the surface on which pressure is applied by the air flowing through the axial-flow fan 7) 702A and a negative pressure side (a surface opposite to the positive pressure side 702A) 702B of the main fan 702. The mirrored surface 702C is formed from the center of the positive pressure side 702A and the negative pressure side 702B toward the rear end in the rotary direction. The mirrored surface 702C may be formed by directly polishing the positive pressure side 702A and the negative pressure side 702B, or alternatively, attaching a lustrous sticker.

Figure 13:
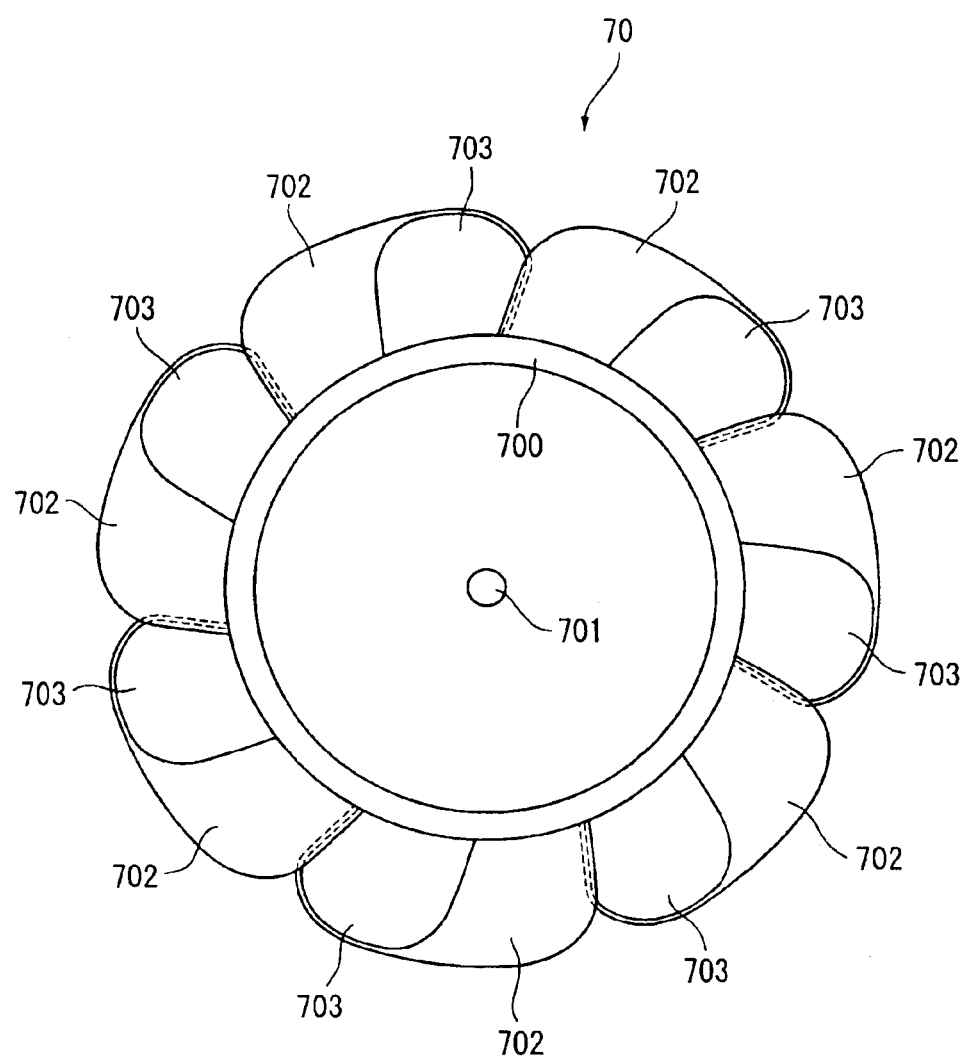
FIG. 13 is a front elevation of the axial-flow fan body.

As shown in FIG. 13, the main fins 702 are disposed so that the adjoining main fins 702 are superposed, for instance by approximately one millimeter, when seen from the exhaust side.

Further, as shown in FIG. 14, the main fins 702 are arranged along the rotary direction at a regular interval by a pitch (dimension between front ends in the rotary direction of the main fin 702) W. The pitch W is 18.7 mm, for instance, and the height H1 in a direction along the axial-direction of the main shaft 701, from the rear end of the main fin 702 in rotary direction to the front end in rotary direction of the main fin 702 is 13.6 mm, for instance. The thickness T1 of the cross section of the main fin 702 in a direction along the axial-direction of the main shaft 701 is 1.2 mm, for instance.

The auxiliary fin 703 has a shape similar to the main fin 702. The height H2 from the rear end to the front end in the rotary direction of the auxiliary fan 703 along the main shaft 701 is approximately three fourths of H1 which may be 9.8 mm, for instance. When X axis is defined along the rotary direction, the position of the front end of the auxiliary fin 703 along the X axis and the position of the front end of the main fin 702 adjoining the auxiliary fin 703 in a reverserotary direction are aligned relative to the X axis.

Further, the rear end of the auxiliary fin 703 is spaced apart from the rear end of the main fin 702 adjoining the auxiliary fin 703 in the reverserotary direction by Wb, for instance ½×W in rotary direction (i.e. +direction along X-axis). In other words, the auxiliary fin 703 is provided approximately at the center of mutually adjoining main fins 702. The thickness T2 of the cross section of the auxiliary fin 703 taken along the axial direction of the main shaft 701 is smaller than the thickness T1 of the cross section of the main fin 702, which maybe 1.0 mm.

Figure 15:
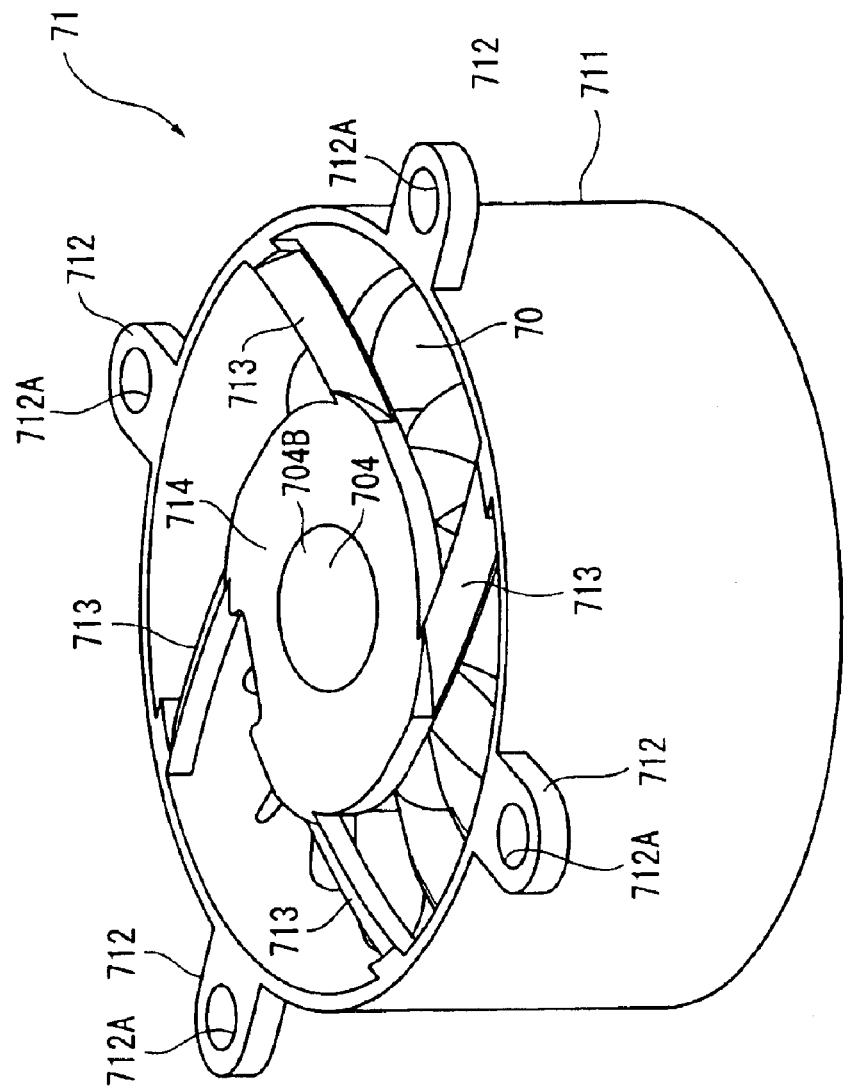
FIG. 15 is a perspective view showing a frame of the axial-flow fan.

As shown in FIGS. 11 and 15, the frame 71 is made of metal, such as aluminum and magnesium, of which the outer diameter is, for instance, not more than 50 mm. The frame 71 has a cylindrical frame body 711 having an open end on both the intake and exhaust sides, and four fixing portions 712.

The fixing portion 712 stretches from the periphery of the opening on the exhaust side of the frame body 711 to the outside of the frame body 711. A screwing hole 712A is formed on the fixing portion 712, on which a duct 64 is screwed. A gap of not more than 0.5 mm, and preferably not more than 0.3 mm, is formed between the inner circumference of the frame body 711 and the main fin 702.

A spoke 713 for holding the motor 73 is provided on the exhaust-side opening of the frame body 711. The spoke 713 stretches from the periphery of the opening on the exhaust side of the Fame body 711 approximately to the center of the opening, which is integrated to a base 714 on the approximate center of the opening of the frame body 711. The motor 73 is mounted on the base 714. A hole 714B having a step 714A is formed approximately at the center of the base 714 and the base 704B of the fluid dynamic bearing 704 is engaged with the step 714A of the hole 714B.

The spoke 713 curves in a direction opposite to the rotary direction of the main fin 702 so that a curved surface for scooping up the air transferred by the main fin 702 is formed. Accordingly, the spoke 713 works as a guide fin for discharging the air transferred by the main fin 702 to the outside of the frame body 711. A gap, not more than 5 mm gap, is formed between the spoke 713 and the rear end in rotary direction of the main fin 702.

The number of spokes 713 is four, for instance, thus setting the number of the main fin 702 minus the number of the spoke 713 to be an odd number.

Figure 16:
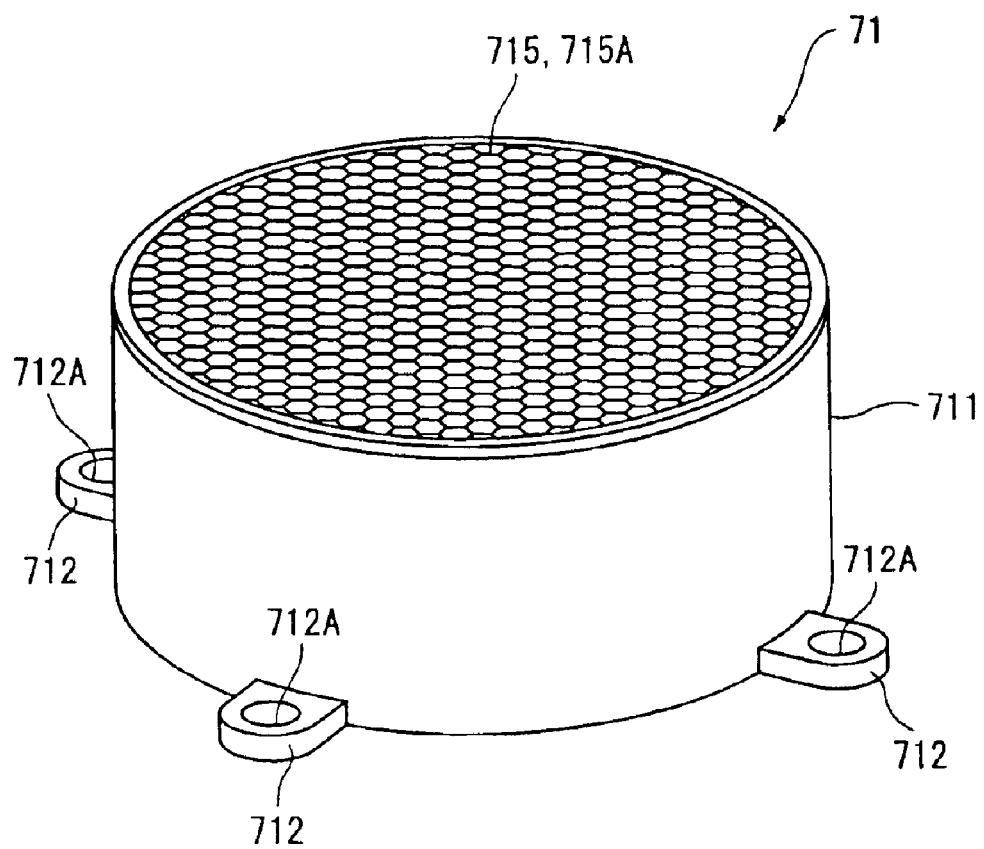
FIG. 16 is a perspective view showing the frame and a filter of the axial-flow fan.

As shown in FIG. 16, a filter 715 covering the intake-side opening is attached on the intake-side opening of the frame body 711. The filter 715 is spaced apart from the intake-side opening of the frame body 711 with a predetermined gap therebetween. For instance, an approximately 3 mm gap is formed between the filter 715 and the intake-side opening of the frame body 711.

Figure 17A:
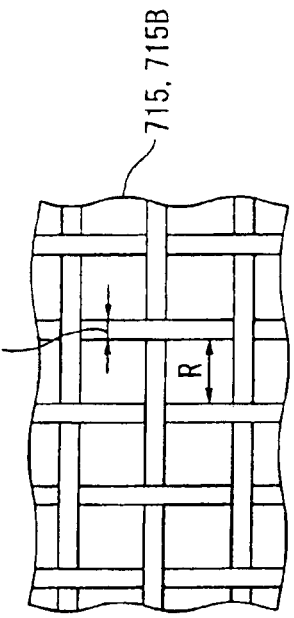
FIG. 17A is a plan view showing the filter of the axial-flow fan.
Figure 17B:
FIG. 17B is a cross-sectional view of the filter shown in FIG. 17A.

Such a filter 715 is constructed by partially bonding and laminating a metal plate, such as SUS or aluminum, or a resin plate and drawing the laminated plate in a direction orthogonal with the metal plate or the resin plate, or by etching a metal plate. The filter 715 may be a filter 715A as shown in FIGS. 16 and 17(A). The filter 715A is made by etching a metal plate, or the like, which has regular hexagonal opening.

Figure 17C:
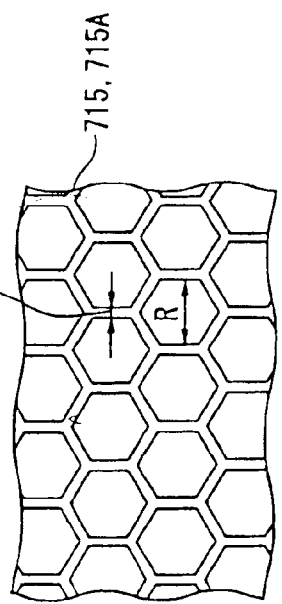
FIG. 17C is a plan view showing the filter of the axial-flow fan.
Figure 17D:
FIG. 17D is a cross-sectional view of the filter shown in FIG. 17C.
Figure 17E:
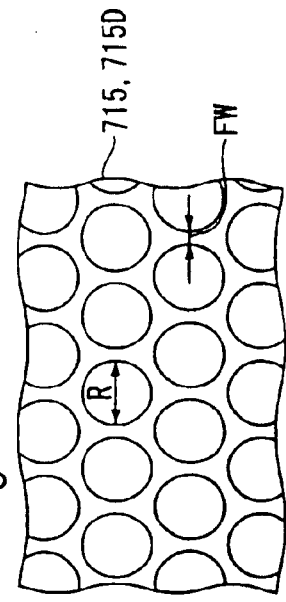
FIG. 17E is a plan view showing the filter of the axial-flow fan.
Figure 17F:
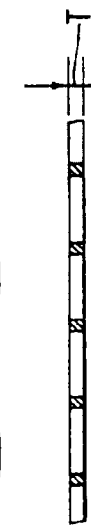
FIG. 17F is a cross-sectional view of the filter shown in FIG. 17E.
Figure 17G:
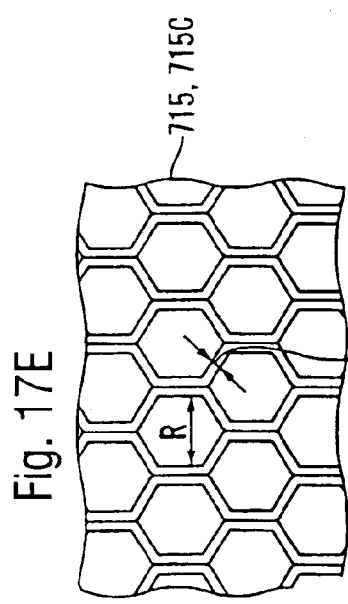
FIG. 17G is a plan view showing the filter of the axial-flow fan.
Figure 17H:
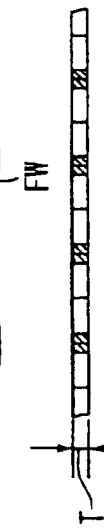
FIG. 17H is a cross-sectional view of the filter shown in FIG. 17G.

Though the filter 715A having regular hexagonal opening is used in the present embodiment, the filter may be arranged as shown in FIGS. 17(B) to 17(H). A filter 715B shown in FIG. 17(C) is constructed by plain-woven metal, such as SUS or wires of heat-resisting resin, which has tetragonal openings. A filter 715C shown in FIG. 17(E) is a so-called honeycomb mesh filter, which has hexagonal openings. A filter 715D shown in FIG. 17(G) has approximately circular holes bored on a plate material.

The thickness T of the filter 715 (715A to 715D) may preferably be not less than 0.1 mm and not more than 5 mm, more preferably not more than 3 mm. The diameter of the opening R may preferably be not less than 0.3 mm and not more than 3 mm, and the opening ratio Q may preferably be not less than 70% and not more than 90%. Width FW of the frame defining the opening is not restricted. Incidentally, the opening diameter R of the filter 715A may preferably be approximately 0.3 mm and the opening diameter R of the filter 715B may preferably be approximately 1.2 mm. Though the opening has hexagonal, tetragonal or circular profile, other configurations, such as a polygonal shape, other than hexagon and tetragon is possible.

Next, as shown in FIG. 10, the cylindrical cover 72 attached to the exhaust side of the frame body 711 will be described below. The cover 72 is made of resin or metal and is configured in a tapered shape having greater diameter toward an air-transferring direction. The length of the cover 72 along the axis of the main shaft 701 is approximately 2 to 5 mm. An approximate flat circular support 720 is provided approximately at the center of the cover 72. A louver 721 is attached inside the cover 72.

Figure 18:
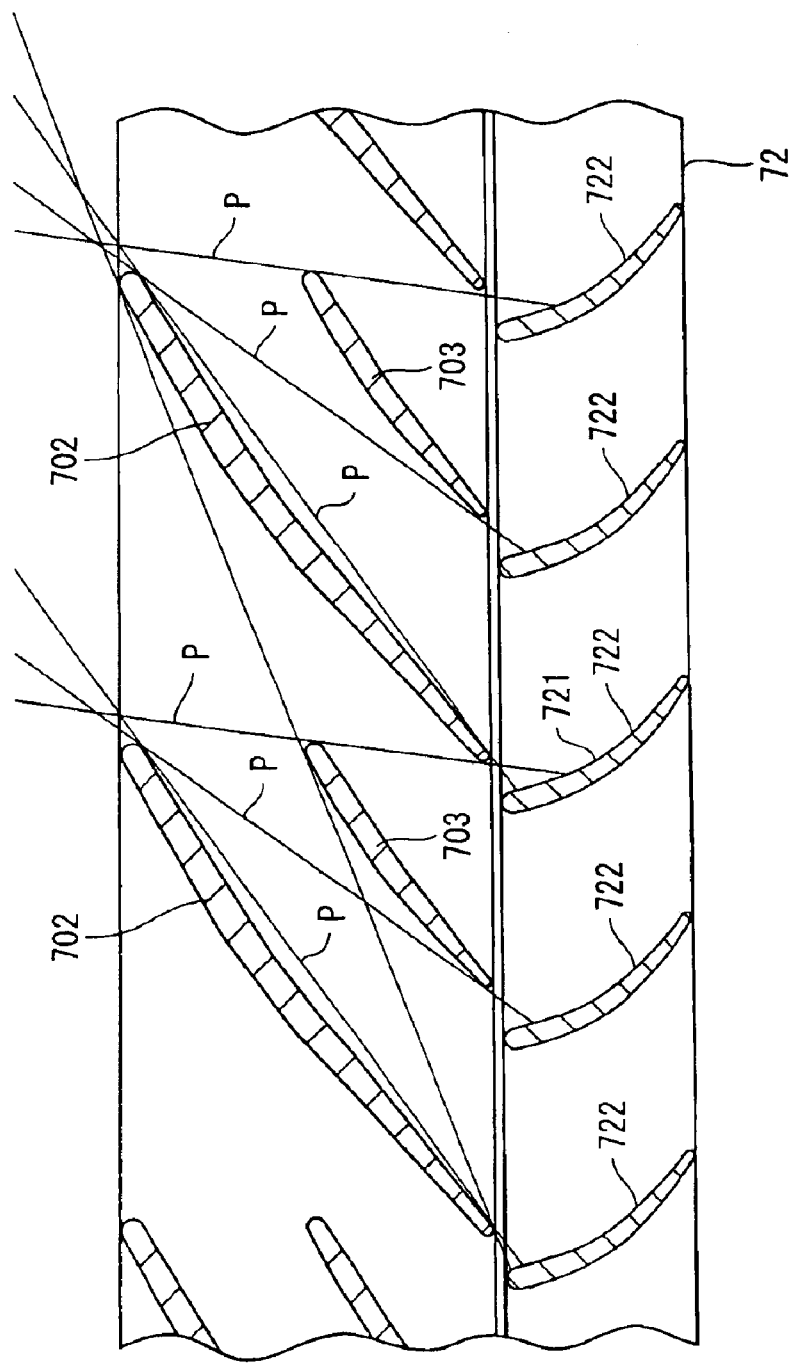
FIG. 18 is a schematic illustration showing a relationship among a main fin, auxiliary fin and a louver component.

The louver 721 has a plurality of louver components 722 extending from a support 720 provided at the center of the cover 72 toward the periphery of the cover 72 disposed at a regular interval. As shown in FIG. 18, the louver components 722 are inclined in a direction opposite to inclination of the main fin 702 and are curved in a direction opposite to the rotary direction of the main fin 702. Accordingly, light P leaked through the gap between the main fins 702 is blocked by the louver components 722.

A curved surface for scooping up the air transferred by the main fin 702 is formed on the louver component 722. Further, the cross section of the louver component 722 along the axis of the main shaft 701 has a streamlined configuration. Accordingly, the louver component 722 works as a guide fin for discharging the air transferred by the main fin 702 toward the outside of the frame 71.

A gap of, for instance, 0.5 mm to 2 mm is formed between the louver component 722 and the frame body 711. The number of the louver components 722 is twice as much as the number of main fins 702. In the present embodiment, since the number of main fins 702 is seven, fourteen louver components 722 are provided.

Since the auxiliary fin 703 is provided, the speed of the air flowing through the axial-flow fan 7 is increased and the speed is leveled, thereby preventing turbulence. Accordingly, even when the axial-flow fan 7 is rotated at a high frequency, the noise generated when the turbulence collides with the main fin 702 and the auxiliary fin 703 can be reduced, thus providing low-noise axial-flow fan 7 while securing high static pressure.

Since the height H2 of the auxiliary fin 703 is approximately three fourths of the height H1 of the main fin 702 and the position of the front end in a rotary direction of the auxiliary fin 703 and the position of the front end in the rotary direction of the main fin 702 adjoining the auxiliary fin 703 in a reverse-rotary direction are aligned relative to X axis, the turbulence can be further effectively prevented.

Since the auxiliary fin 703 is provided, the amount of light leaking through the gap between the main fins 702 can be reduced.

Since the distance Wb between the rear end in the rotary direction of the auxiliary fin 703 and the rear end of the main fin 702 in the rotary direction adjoining the auxiliary fin in the reverse-rotary direction is ½×W, the speed of the air flowing through the axial-flow fan 7 can be leveled in a more effective manner, thus reducing turbulence.

Since the attachment angle $\theta_2$ of the auxiliary fin 703 is set as $\theta_1+5°$ $\theta_1$:attachment angle of the main fin 702) at the maximum so that the space between the auxiliary fin 703 and the adjoining main fin 702 in the reverse-rotary direction is narrowed, the speed of the air can be enhanced and smooth flow can be obtained. Accordingly, turbulence can be effectively prevented and noise can be reduced.

Since the cross sections of the main fin 702 and the auxiliary fin 703 taken along the axial direction of the main shaft 701 have a streamlined shape, the resistance between the air flowing in the axial-flow fan 7 and the main fin 702 and the auxiliary fin 703 can be reduced, thus reducing the noise.

Since the thickness of the cross section of the auxiliary fin 703 is not more than the thickness of the cross section of the main fin 702, turbulence can be further effectively prevented.

Since the adjoining main fins 702 are superposed when seen in the exhaust side, light leakage through the gap between the main fins 702 can be substantially securely prevented.

Since the mirrored surface 702C is formed on the positive pressure side 702A and the negative pressure side 702B of the main fin 702, the airflow-separation where the air flows more closely to the main fin 702 can be reduced when the air collides with the main fin 702, thus securely preventing the turbulence and reducing the noise of the axial-flow fan 7.

Since the spoke 713 attached to the periphery of the exhaust-side opening of the frame body 711 is curved in a direction opposite to the rotary direction of the main fin 702 and a curved surface for scooping up the air transferred by the main fin 702 is formed thereon, the spoke 713 can work as a guide fin, thus further smoothly discharging the air. Accordingly, the noise generated when the discharged air and the spokes 713 collide with each other can be reduced.

Since the number of main fins 702 minus the number of spokes 713 is an odd number, resonance can be prevented, and the noise can be reduced.

When the frame 71 is molded of a material having low thermal conductivity, since heat is not easily radiated, the coil 733 of the motor 73 and the IC on the substrate 735 for driving the motor may be damaged by the heat of the coil 733 for driving the main shaft 701. On the other hand, since the frame 71 is made of metal in the present embodiment, heat radiation can be enhanced and the coil 733 and the IC for driving the motor are less likely to be damaged by the heat, thus improving durability of the axial-flow fan 7.

Since the frame 71 is made of metal, the rigidity and accuracy of the frame 71 can be secured.

Since the frame 71 is made of metal, the frame 71 can be recycled, thus meeting the demand for environmental protection.

Since the gap between the inner circumference of the frame body 711 and the main fin 702 is not more than 0.5 mm, high static pressure can be obtained. Accordingly, since there is no need for rotating the axial-flow fan 7 at a high speed, the noise can be further reduced.

Though it is possible to provide a flange along the entire circumference of the opening of the frame body 711 and a screw hole may be formed on the flange, since the flange is provided along the entire circumference of the opening, weight reduction is difficult. On the other hand, since only the fixing portion 712 is provided on the circumference of the opening without forming the flange on the entire circumference of the frame body 711 in the present embodiment, the weight of the frame 71 can be reduced.

When the filter 7 is not provided, the air is drawn in any direction because of the strong intake force of the axial-flow fan 7, thereby causing turbulence and noise. On the other hand, when the filter 7 having regular hexagonal openings is provided, as in the present embodiment, the direction of the air drawn in by the axial-flow fan 7 can be aligned, thereby reducing the noise. Further, since a gap is formed between the filter 7 and the opening of the frame body 711, the noise can be reduced in further effective manner.

Though it is possible to configure the opening of the filter 715 in a honeycomb shape, the opening of honeycomb shape is easily deformed. On the other hand, since the filter 715A having regular hexagonal opening is employed in the present embodiment, the opening is less likely to be deformed than honeycomb arrangement, so that noise reduction effect can be securely obtained. Incidentally, the same advantage can be obtained when the filter 715B having tetragonal opening is used.

When the diameter of the opening R of the filter 715 is less than 0.3 mm or the opening ratio is less than 70%, the air may not smoothly flow through the opening and the flow rate may be lowered. Further, when the diameter of the opening R is greater than 3 mm, the flow of the air may be difficult to be aligned. When the opening ratio exceeds 90%, processability of the filter may be deteriorated. In the present embodiment, since the diameter of the opening R of the filter 715 is 0.3 mm to 3 mm and the opening ratio Q is not less than 70% and not more than 90%, the above disadvantages can be avoided.

Since the louver 721 as a guide fin is provided on the cover 72 attached to the exhaust side of the frame body 711, the flow of the discharged air can be straightened. Accordingly, the turbulence can be prevented and further noise reduction is possible. Further, since a gap is formed between the louver 721 and the opening of the frame body 711, the noise can be further reduced.

The attachment angle (inclination angle of the louver component 722 relative to the axis of the main shaft 701) of the louver component 722 can be magnified in accordance with the length of the cover 72 along the axial direction of the main shaft 701 and the louver component 722 can be extended in a direction along the air flow to be discharged, so that the resistance generated between the louver component 722 and the discharged air can be reduced. Accordingly, it is preferable to lengthen the length of the cover 72 along the axial direction of the main shaft. However, when the length is excessively long, it becomes difficult to attach the duct 64 on the axial-flow fan 7. In the present embodiment, since the length of the cover 72 along the axial direction of the main shaft 701 is around 2 to 5 mm, the resistance against the discharged air can be restrained and the duct 64 can be easily attached.

Since the louver component 722 is oppositely inclined relative to the inclination of the main fin 702 and the number of the louver components 722 is twice as much as the main fin 702, the light P leaking through the main fins 702 and through the gap between the main fin 702 and the auxiliary fin 703 can be blocked (see FIG. 18). Accordingly, the unpleasant feeling on account of light leakage is not caused on a user, and a projector 1 having improved operability can be provided.

Though a bearing of axial-flow fan is usually a ball bearing, abrasion sound is likely to be generated in accordance with the rotation of the main shaft 701 when a ball bearing is used. On the other hand, since the fluid dynamic bearing 704 is used in the present embodiment, the abrasion sound in accordance with the rotation of the main shaft 701 can be prevented, and the noise can be reduced.

Figure 19:
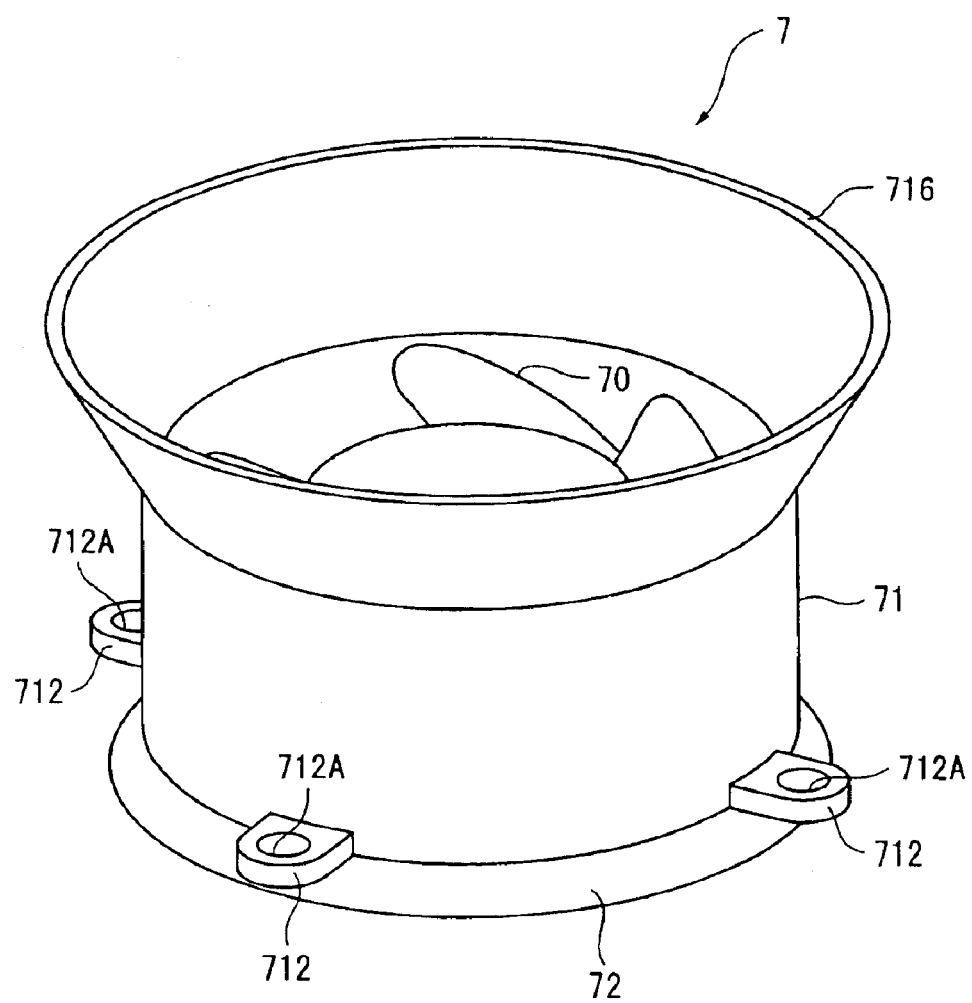
FIG. 19 is a perspective view showing an axial-flow fan according to second embodiment.

Next, a second embodiment of the present invention will be described below. Incidentally, in the following, the same reference numerals will be attached to the same components to omit the description thereof In the first embodiment, the filter 715 is attached to the intake-side opening of the frame body 711. In contrast, as shown in FIG. 19, a straightening plate 716 is attached in the present embodiment. The straightening plate 716 has a tapered configuration in which the diameter becomes greater toward the direction opposite to the air-transferring direction.

Figure 20:
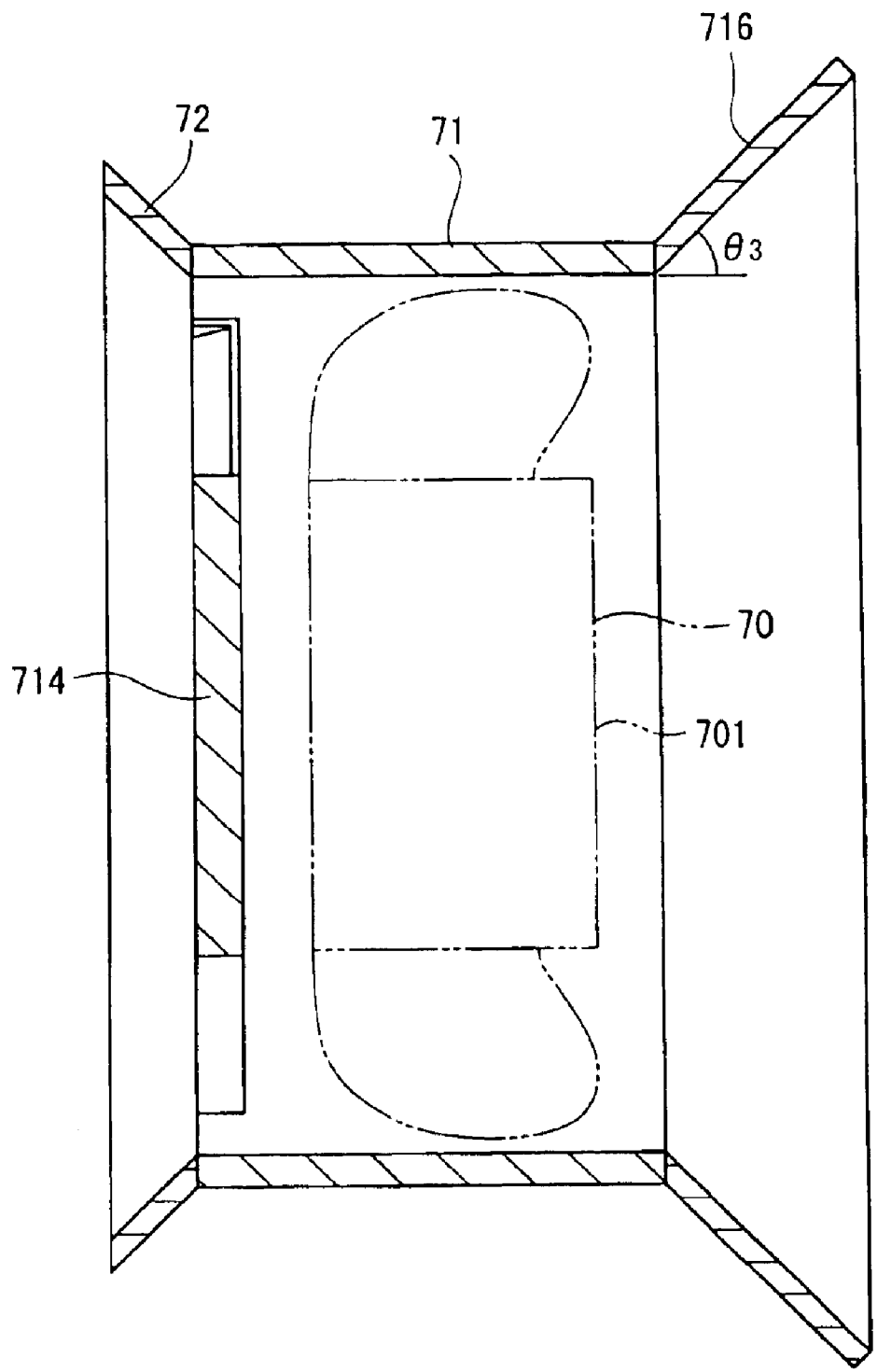
FIG. 20 is a cross section showing the axial-flow fan.

As shown in FIG. 20, an inclination angle $\theta_3$ of the straightening plate 716 relative to the main shaft 701 is, for instance, 45 degrees. The length of the straightening plate 716 in the axial direction of the main shaft 716 is, for instance, 1.5 mm to 10 mm or less. The same filter 715 as the component of the first embodiment may be attached to the intake hole of the straightening plate 716. The filter 715 aligns the direction of the air drawn in by the axial-flow fan 7 to reduce the noise.

Figure 21:
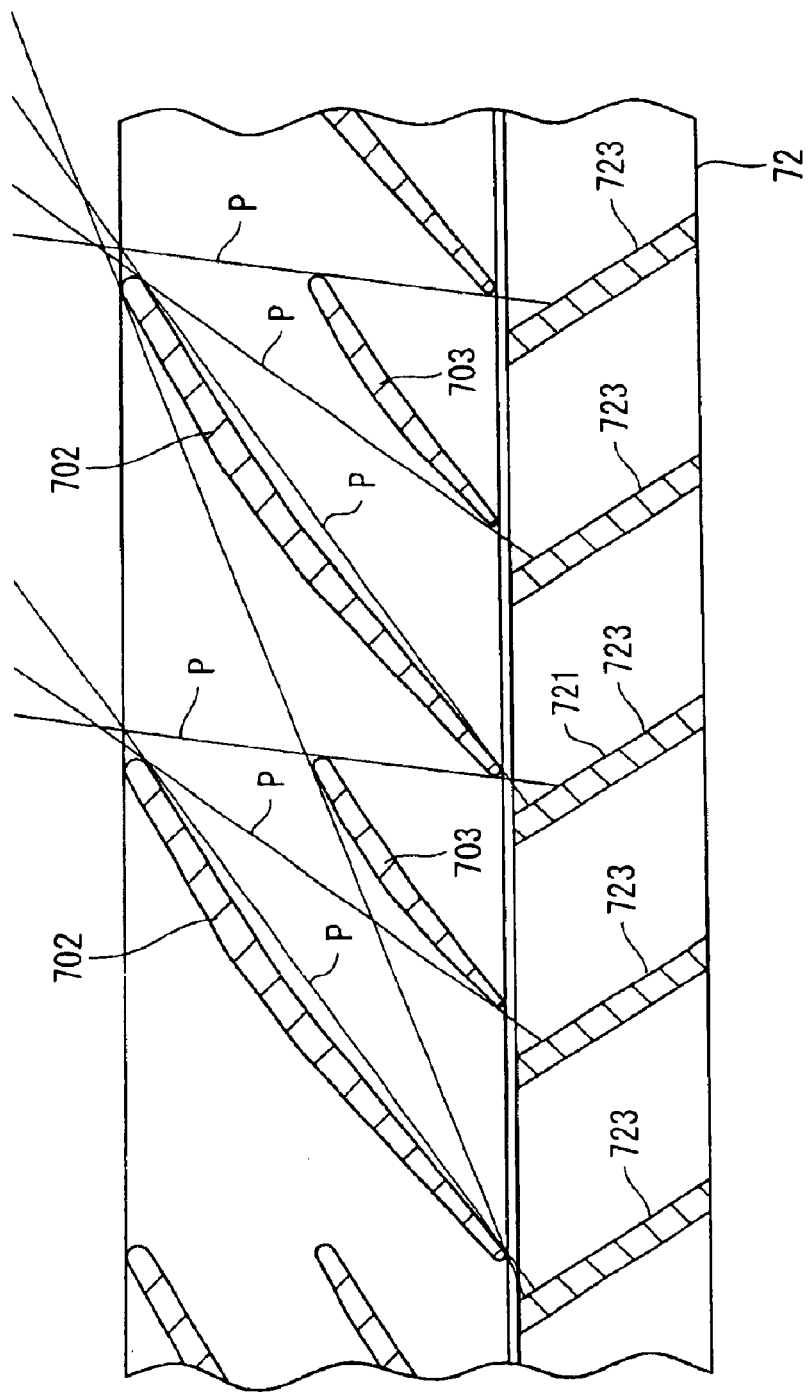
FIG. 21 is a schematic illustration showing a relationship among a main fin, auxiliary fin and a louver component.
Figure 22:
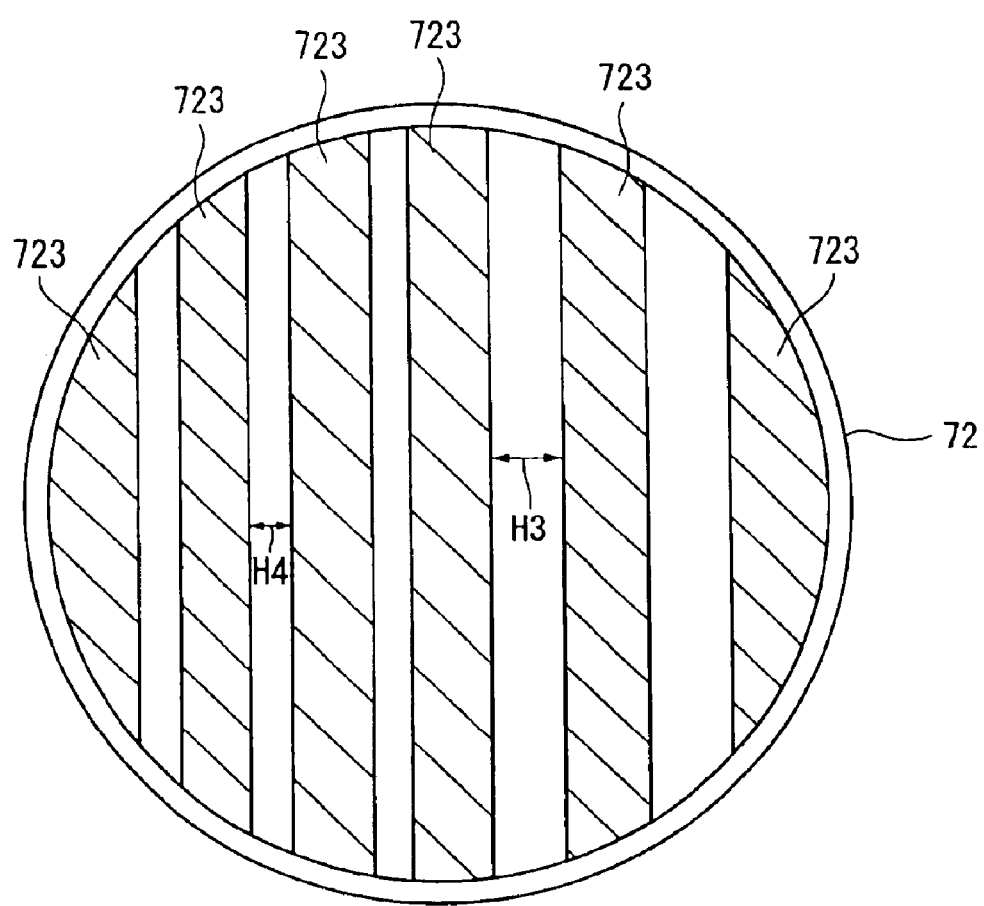
FIG. 22 is a plan view showing a cover of the axial-flow fan.

Further, the louver 721 in the first embodiment has the plurality of louver components 722 stretching from the center of the cover 72 toward the periphery thereof. On the other hand, as shown in FIGS. 21 and 22, louver components 723 of the present embodiment are arranged in parallel at a predetermined interval. The louver components 723 are slanted toward depth side in FIG. 22. Incidentally, the louver components 723 are shown with diagonal lines in FIG. 21 to highlight the louver components 723 and the gap between the louver components 723.

As shown in FIG. 21, since the light P passing through the main fins 702 and the auxiliary fin 703 is blocked by the louver components 723 at the portion where the inclination of the main fin 702 is substantially orthogonal to the light-shielding surface of the louver components 723 (right side in FIG. 22) and the light can be securely shielded, a gap H3 between the louver components 723 is set wide. A gap H4 between the louver components 723 where the inclination of the main fin 702 is parallel to the light-shielding surface of the louver components 723 (left side in the figure) is narrow and the louver components 723 are densely disposed.

According to the present embodiment, the following advantages, as well as many of the same advantages as the advantages described above with regard to the first embodiment, can be obtained.

When the straightening plate 716 is not provided, air is drawn in any direction because of strong suction force of the axial-flow fan 7, and the resulting turbulence is likely to be generated and cause noise. In contrast, since the tapered straightening plate 716 is provided in the present embodiment, the direction of the air drawn in by the axial-flow fin 7 can be aligned, so that the noise can be reduced.

Further, when the filter 715 is attached to the intake hole of the straightening plate 716, the noise can be reduced not only by the straightening plate 716 but also by the filter 715, so that the noise of the axial-flow fan 7 can be further reduced.

When the diameter of the straightening plate is the same as that of the opening of the frame body 711, since the straightening plate blocks the intake air flow, sufficient noise reduction effect cannot be obtained. In the present embodiment, since the straightening plate 716 is configured in a tapered shape, the air flow is not blocked by the straightening plate 716, so that the noise can be sufficiently reduced.

Since the louver component 723 is arranged so that the shield surface of the louver component 723 becomes orthogonal to the inclination of the main fin 702, the light leakage from between the main fins 702 can be shielded by the louver component 723.

In the present embodiment, the gap between the adjoining louver components 723 is widened where the inclination of the main fin 702 is substantially orthogonal with the light-shielding surface of the louver components 723. Accordingly, flow rate loss can be restrained and the noise can be further lowered.

Further, the gap between the louver components 723 is narrowed where the light-shielding surface of the louver component 723 and the inclination of the main fin 702 are approximately parallel and the louver components 723 are densely disposed, so that the light leakage through the gap between the louver components 723 can be prevented.

Since the louver components 723 are disposed approximately parallel in the present embodiment, the louver components 723 can be easily installed.

Incidentally, the scope of the present invention is not restricted to the above embodiments, but includes modifications and improvement as long as an object of the present invention can be achieved.

Though the cover 72 is attached to the frame body 711 in the above embodiments, the cover 72 may be attached to the exterior case 2. However, when the cover 72 is attached to the exterior case 2, the mount position of the axial-flow fan 7 may be shifted and the position of the louver components 722 and 723 of the cover 72 relative to the main and auxiliary fins 702 and 703 may also be shifted. Accordingly, it is likely that the light-shielding effect of the louver components 722 and 723 may not be sufficiently exerted and an arrangement for overcoming the above disadvantage is required.

On the other hand, when the cover 72 is attached to the frame body 711, even when the mount position of the axial-flow fan 7 is shifted, there is no shift between the louver components 722 and 723 and the main and auxiliary fins 702 and 703, and light leakage can be effectively prevented. The planar shape of the cover, as seen from the exhaust side, may not be circular but may be rectangular.

Though the thickness of the filter 715 is 0.1 to 5 mm in the first embodiment, such range is not intended limiting. Other ranges are contemplated that successfully perform the filter functionality.

Though the opening of the filter 715 is arranged in regular hexagon in the first embodiment, the opening may have circular profile. The filter may be a component of metal, such as SUS, or a component having rectangular opening by plain weaving of a wire of heat-resistance resin.

Though the diameter R of the opening of the filter 715 is not less than 0.3 mm and not more than 3 mm, the diameter may be set outside the above range. Though the opening ratio is set within the range of 70 to 90%, the range is not limiting but the opening ratio may be set within the range of 50 to 95%.

Though only the filter 715 is attached and no straightening plate 716 is attached in the first embodiment, both of the filter 715 and the straightening plate 716 may be attached. The noise can be further reduced by attaching both of the filter 715 and the straightening plate 716.

Though the inclination angle $\theta_3$ of the straightening plate 716 relative to the main shaft 701 is 45 degrees in the second embodiment, the range is not limiting but may be designed in any manner within the range of 30 to 90 degrees. Within the range of 30 to 90 degrees, the noise can be sufficiently reduced without blocking the intake airflow by the straightening plate 716. The specific value of $\theta_3$ may be defined in accordance with the static pressure of the axial-flow fan and the vector of primary flow speed determined in accordance with flow rate.

Though the frame 71 is made of metal in the above embodiments, the frame 71 may be made of resin having high thermal conductivity. According to this arrangement, heat radiation of the frame 71 can be improved as the metal-frame.

Though the spoke 713 works as a guide fin in the above embodiment, the spoke 713 may only support the motor 73. According to the above arrangement, since there is no need for curving the spoke or forming a curved surface for scooping up the transferred air, the spoke can be easily formed.

Though the mirrored surface 702C is formed on the positive pressure side 702A and the negative pressure side 702B of the main fin 702, the mirrored surface 702C may not be formed. When the mirrored surface 702C is not formed, the troublesome work for processing the main fin 702 can be omitted.

Though the main fin 702 is superposed on the adjoining main fin 702 when being seen from the exhaust side, when the light leakage can be approximately completely prevented only by the louver 721 of the cover 72, the main fins 702 may not be disposed in a superposed manner, thereby facilitating the attachment process of the main fin 702.

Though the thickness T2 of the auxiliary fin 703 is less than the thickness T1 of the main fin 702 in the above embodiments, T2 may be the same as T1 or may be greater than T1.

When the attachment angle of the auxiliary fin 703 relative to the main shaft 701 is defined as $\theta_2$ and the attachment angle of the main fin 702 relative to the main shaft 701 is defined as $\theta_1$, $\theta_2$ is $\theta_1-10°$ or more and $\theta_1+5°$ or less and more preferably $\theta_2=\theta_1+5°$ in the above embodiments, such an angle is not limiting, but the angles may be defined in any manner as long as noise reduction effect can be obtained.

Though the cross section of the main fin 702 and the auxiliary fin 703 along the axial direction of the main shaft 701 has a streamlined shape, the cross section may be arranged as mere rectangular shape. However, since the resistance against air flow increases in the above arrangement, noise reduction effect may be lowered as compared to an arrangement of streamlined configuration.

Further, though the rear end in rotary direction of the auxiliary fin 703 is located at a position spaced apart from the rear end of the main fin 702 adjoining in the reverse-rotary direction by ½×W, such arrangement is not limiting but may be located at a position spaced apart from the rear end by, for instance, ¼×W.

Though the position of the front end in the rotary direction of the auxiliary fin 703 relative to the X axis is aligned with the front end in the rotary direction of the main fin 702 adjoining in the reverse-rotary direction, such arrangement is not limiting but the front end in the rotary direction of the auxiliary fun 703 may be located at any position within a range from –⅛×W to +⅛×W relative to the front end of the main fin 702. Though the height of the auxiliary fin 703 is three fourths of the height of the main fin 702, the height may be set within the range of ½ to ⅘ of the height of the main fin 702 where the noise reduction is possible. However, the highest noise reduction effect can be obtained by arranging the height of the auxiliary fin 703 as three fourths of the height of the main fin 702 and aligning the front end of the auxiliary fin 703 with the front end of the main fin 702 adjoining in the reverse-rotary direction.

[Experiments]

The following experiments were conducted in order to confirm the advantages of the present invention.

[Relationship between Auxiliary Fin and Main Fin]

The following experiments were conducted in order to confirm that the relationship between the auxiliary fin and the main fin is capable of securing sufficient air flow rate and the amount of noise can be reduced.

The shape and location of the main fin 702 and the auxiliary fin 703 were arranged in different manner to simulate the generation of turbulence energy of the air flowing through the axial-flow fan around the main fin 702 and the auxiliary fin 703.

The turbulence energy generally is usually referred to as inertial force, which can be represented as the square of velocity. The inertial force (also referred to as pressure resistance) is a resistance emerging as reaction of a change in the velocity of the fluid in colliding with an object, which is equal to a normal stress applied on the surface of the object by the fluid. The noise level is generally calculated by pressure fluctuation of the fin wall surface (surface of the main fin 702 and the auxiliary fin 703) of the fan using Curle's equation. Accordingly, since the noise level can be calculated based on the pressure fluctuation on the fin wall surface of the fan, the noise level is determined according to the generation of the turbulence energy representing normal stress applied on the fin wall surface in the present experiment.

Initially, the air-introducing condition into the axial-flow fan when the axial-flow fan generates desired air flow was measured, based on which the condition for flowing the air to the axial-flow fan was calculated. As a result, the flow angle was 60° and the flow rate was 3.2 m/sec.

The height H1 of the main fin 702 was 13.6 mm, the pitch W was 18.7 mm, the attachment angle $\theta_1$ was 40°, and the thickness T1 of the main fin 702 was 1.2 mm. The thickness T2 of the auxiliary fin 703 was 1.0 mm.

Figure 23:
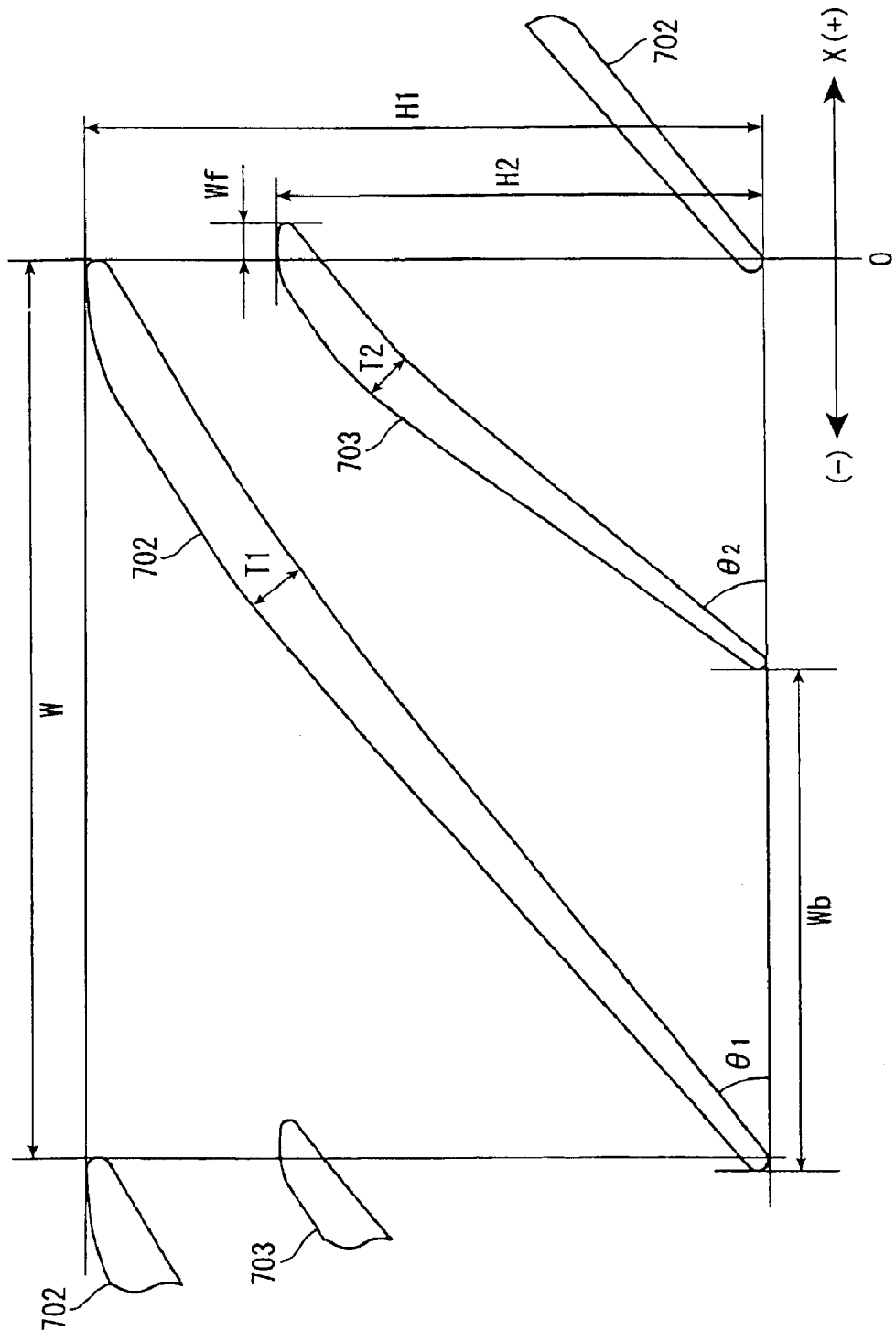
FIG. 23 is a development elevation of the body of the axial-flow fan used in an experiment.

As shown in FIG. 23, the X-axis was set along the rotary direction of the axial-flow fan, where the rotary direction was represented as +(plus) and the reverse rotary direction was represented as –(minus). Further, the dimension on the X-axis from the front end in the rotary direction of the auxiliary fin 703 to the front end in the rotary direction of the main fin 702 adjoining the auxiliary fin 703 in reverse rotary direction was represented as Wf, and the dimension along the X-axis from the rear end of the main fin 702 in the rotary direction adjoining the auxiliary fin 703 in the reverse rotary direction to the rear end in the rotary direction of the auxiliary fin 703 was represented as Wb.

(1) The Relationship between Height H2 of the Auxiliary Fin 703 and the Turbulence Energy Wf was set zero and Wb was set approximately ½×W, i.e. 9.4 mm.

(Experiment 1-1)

The dimension of H2 was 6.8 mm (approximately half of H1).

(Experiment 1-2)

The dimension of H2 was 9.1 mm (approximately two thirds of H1).

(Experiment 1-3)

The dimension of H2 was 9.8 mm (approximately three fourths of H1).

(Experiment 1-4)

The dimension of H2 was 10.9 mm (approximately four fifths of H1).

(Comparison 1-1)

The dimension of H2 was 3.4 mm (approximately one fourth of H1).

(Comparison 1-2)

The dimension of H2 was 11.3 mm (approximately five sixths of H1).

The results of experiments 1-1 to 1-4 and comparisons 1-1 and 1-2 are shown in Table 1.

TABLE 1

|  | Experiment 1-1 | Experiment 1-2 | Experiment 1-3 | Experiment 1-4 | Comparison 1-1 | Comparison 1-2 |
| --- | --- | --- | --- | --- | --- | --- |
| H2 [mm] | 6.8 | 9.1 | 9.8 | 10.9 | 3.4 | 11.3 |
| Relative to H1 (approx) | ½ | ⅔ | ¾ | ⅘ | ¼ | ⅚ |
| Result | ○ | ○ | ○ | ○ | x | x |

In the above, when turbulence energy of 1.9 m²/sec² or more was generated at one or less spot, the result of the simulation was evaluated as o and when turbulence energy of 1.9 m²/sec² or more was generated at two or more spots, the result was evaluated as x.

According to the experiments 1-1 to 1-4, the turbulence energy of 1.9 m²/sec² or more was generated at one or less spot, and the noise reduction effect was confirmed. Especially, no turbulence energy of 1.9 m²/sec² or more was generated in the experiment 1-3 (H2=9.8 mm), and the highest noise reduction effect was obtained.

On the other hand, turbulence energy of 1.9 m²/sec² or more was generated at two or more spots in the comparisons 1-1 and 1-2, and no noise reduction effect was confirmed.

Accordingly, noise reduction effect could be obtained when the height H2 of the auxiliary fin 703 was not less than ½ and not more than ⅘ of the height H1 of the main fin 702.

(2) Relationship between the Position of Front End in Rotary Direction of Auxiliary Fin 703 and Generation of Turbulence Energy The relationship between the position of the front end of the auxiliary fin 703 in the rotary direction and the generation of turbulence energy was tested. Wb was set approximately equal to ½×W, i.e. 9.4 mm and the height H2 of the auxiliary fin 703 was set as approximately half of the height H1 of the main fin 702, i.e. 6.8 mm.

Incidentally, the position of the front end of the main fin in the rotary direction adjoining the auxiliary fin in the reverse rotary direction was represented as 0, the rotary direction on X-axis was represented as +, and the reverse rotary direction was represented as −.

(Experiment 2-1)

Wf was −2.3 mm (−⅛×W).

(Experiment 2-2)

Wf was −2.1 mm (−1/9×W).

(Experiment 2-3)

Wf was 0 mm.

(Experiment 2-4)

Wf was +2.1 mm (+1/9×W).

(Experiment 2-5)

Wf was +2.3 mm (+⅛×W).

(Comparison 2-1)

Wf was −2.7 mm (−1/7×W).

(Comparison 2-2)

Wf was +2.7 mm (+1/7×W).

The results of experiments 2-1 to 2-5 and comparisons 2-1 and 2-2 are shown in Table 2.

Incidentally, there was little difference in the generation of the turbulence energy in the experiments 2-1 to 2-5. Accordingly, considering the convenience in design and processability, the position of the front end in the rotary direction of the auxiliary fin 703 and the front end in the rotary direction of the main fin 702 adjoining the auxiliary fin 703 in the reverse rotary direction may preferably be approximately aligned (Wf=0). Accordingly, the production cost and noise can be reduced.

(3) Relationship between the Position of Rear End in Rotary Direction of Auxiliary Fin 703 and Generation of Turbulence Energy The relationship between the position of the rear end in the rotary direction of the auxiliary fin 703 and the generation of turbulence energy was tested.

Wf was set zero and the height H2 of the auxiliary fin 703 was set as approximately half of the height H1 of the main fin 702, i.e. 6.8 mm.

(Experiment 3-1)

Wb was set as 9.4 mm (½×W).

(Experiment 3-2)

Wb was set as 7.4 mm (⅖×W).

(Experiment 3-3)

Wb was set as 4.7 mm (¼×W).

(Comparison 3-1)

Wb was set as 12.5 mm (⅔×W).

TABLE 2

|  | Experiment 2-1 | Experiment 2-2 | Experiment 2-3 | Experiment 2-4 | Experiment 2-5 | Comparison 2-1 | Comparison 2-2 |
| --- | --- | --- | --- | --- | --- | --- | --- |
| Wf [mm] | −2.3 | −2.1 | 0.0 | 2.1 | 2.3 | −2.7 | 2.7 |
| Relative to W (approx) | −1/8 | −1/9 | 0 | 1/9 | 1/8 | −1/7 | 1/7 |
| Result | ○ | ○ | ○ | ○ | ○ | X | X |

In the above, when turbulence energy of 1.9 m²/sec² or more was generated at one or less spot, the result of the simulation was evaluated as o and when turbulence energy of 1.9 m²/sec² or more was generated at two or more spots, the result was evaluated as x.

According to the experiments 2-1 to 2-5, the turbulence energy of 1.9 m²/sec² or more was generated at one or less spot, and the noise reduction effect was confirmed. On the other hand, turbulence energy of 1.9 m²/sec² or more was generated at two or more spots in the comparisons 2-1 and 2-2, and no noise reduction effect was confirmed. Accordingly, a noise reduction effect could be obtained when the range was within −⅛and +⅛of the pitch W of the main fin 702.

(Comparison 3-2)

Wb was set as 11.4 mm (⅗×W).

(Comparison 3-3)

Wb was set as 3.7 mm (⅓×W).

The results are shown in Table 3.

TABLE 3

|  | Experiment 3-1 | Experiment 3-2 | Experiment 3-3 | Comparison 3-1 | Comparison 3-2 | Comparison 3-3 |
| --- | --- | --- | --- | --- | --- | --- |
| Wb [mm] | 9.4 | 7.4 | 4.7 | 12.5 | 11.4 | 3.7 |
| Relative to W (approx) | ½ | ⅖ | ¼ | ⅔ | ⅗ | ⅓ |
| Result | ⊙ | ○ | ○ | X | X | X |

In the above, when turbulence energy of 1.9 m²/sec² or more was generated at one or less spot, the result of the simulation was evaluated as o and when turbulence energy of 1.9 m²/sec² or more as generated at two or more spots, the result was evaluated as x. Further, when turbulence energy of 1.5 m$^2$/sec$^2$ or more and 1.9 m$^2$/sec$^2$ or less was generated at two or less spot, the result of the simulation was evaluated as o.

According to the experiments 3-1 to 3-3, the turbulence energy of 1.9 m$^2$/sec$^2$ was generated at one or less spot, and the noise reduction effect was confirmed. Further, according to the experiment 3-1, the turbulence energy not less than 1.5 m$^2$/sec$^2$ and not more than 1.9 m$^2$/sec$^2$ was generated at two or less spot and turbulence energy exceeding 1.9 m$^2$/sec$^2$ was not generated. It was confirmed that when the auxiliary fin 703 was provided approximately at the center of mutually adjoining main fins 703 as in the experiment 3-1, the velocity of the air flowing through the axial-flow fan can be effectively made even and the generation of turbulence can be prevented, so that further noise reduction was possible. On the other hand, turbulence energy of 1.9 m$^2$/sec$^2$ or more was generated at two or more spots in the comparisons 3-1 to 3-3, and no noise reduction effect was obtained.

Accordingly, noise reduction effect could be obtained when the rear end in the rotary direction of the auxiliary fin 703 was located within not more than half and not less than one fourth of the pitch W of the main fin 702 along the rotary direction thereof.

(4) Relationship between Attachment Angle $\theta_2$ of the Auxiliary Fin 703 and Generation of Turbulence Energy Wf was set zero, and Wb was set as ½×W, i.e. 9.4 mm.

(Experiment 4-1)
Attachment angle $\theta_2$ was set as 30° ($\theta_2=\theta_1-10°$).

(Experiment 4-2)
Attachment angle $\theta_2$ was set as 40° ($\theta_2=\theta_1$).

(Experiment 4-3)
Attachment angle $\theta_2$ was set as 45° ($\theta_2=\theta_1+5°$).

(Comparison 4-1)
Attachment angle $\theta_2$ was set as 20° ($\theta_2=\theta_1-20°$).

(Comparison 4-2)
Attachment angle $\theta_2$ was set as 50° ($\theta_2=\theta_1+10°$).

The results are shown in Table 4.

TABLE 4

|  | Experiment 4-1 | Experiment 4-2 | Experiment 4-3 | Comparison 4-1 | Comparison 4-2 |
|---|---|---|---|---|---|
| $\theta_2$ [°] | 30 | 40 | 45 | 20 | 50 |
| Relative to $\theta_1$ (approx) | −10 | +0 | +5 | −20 | +10 |
| Result | o | o | o | x | x |

In the above, when turbulence energy of 1.9 m$^2$/sec$^2$ or more was generated at one or less spot, the result of the simulation was evaluated as o and when turbulence energy of 1.9 m$^2$/sec$^2$ or more was generated at two or more spots, the result was evaluated as x.

According to the experiments 4-1 to 4-3, the turbulence energy of 1.9 m$^2$/sec$^2$ or more was generated at one or less spot, and the noise reduction effect was confirmed. Especially, no turbulence energy of 1.9 m$^2$/sec$^2$ or more was generated in the experiment 4-3 (attachment angle $\theta_2=45°$) and the highest noise reduction effect was obtained.

On the other hand, turbulence energy of 1.9 m$^2$/sec$^2$ or more was generated at two or more spots in the comparisons 4-1 and 4-2, and no noise reduction effect was confirmed.

Accordingly, noise reduction effect could be obtained when the attachment angle $\theta_2$ was within the range of $\theta_1-10°$ and $\theta_1+5°$.

[Relationship between Filter and Noise]

The filters 715A, 715B and 715C were attached to the intake opening of the frame body 711 of the axial-flow fan and the noise of the axial-flow fan and the flow rate of the air drawn in by the axial-flow fan (intake flow rate) was measured. The following experiments and comparisons were conducted under the same measurement condition.

(Experiment 5-1)
The filter 715A was used, where the opening diameter R was 0.30 mm, width FW of the frame defining the opening was 0.04 mm and opening ratio Q was 78%.

(Experiment 5-2)
The filter 715B was used, where the opening diameter R was 1.2 mm, width FW of the frame defining the opening was 0.30 mm and opening ratio Q was 70%.

(Experiment 5-3)
The filter 715C was used, where the opening diameter R was 0.87 mm, width FW of the frame defining the opening was 0.02 mm and opening ratio Q was 81%.

(Comparison 5-1)
The filter 715B was used, where the opening diameter R was 0.32 mm, width FW of the frame defining the opening was 0.10 mm and opening ratio Q was 58%.

(Comparison 5-2)
The filter 715B was used, where the opening diameter R was 5.50 mm, width FW of the frame defining the opening was 0.80 mm and opening ratio Q was 76%.

(Reference)
No filter 715 was attached.

The results are shown in Table 5.

TABLE 5

|  |  | Experiment 5-1 | Experiment 5-2 | Experiment 5-3 | Comparison 5-1 | Comparison 5-2 | Reference |
|---|---|---|---|---|---|---|---|
| Filter Configuration | Type | 715A | 715B | 715C | 715B | 715B |  |
|  | Opening Diameter R | 0.30 | 1.20 | 0.87 | 0.32 | 5.50 |  |
|  | Frame Width FW | 0.04 | 0.30 | 0.02 | 0.10 | 0.80 |  |
|  | Opening Ratio Q [%] | 78 | 70 | 81 | 58 | 76 |  |
| Noise [dB] |  | 34.5 | 34.0 | 35.5 | 34.8 | 39.2 | 39.7 |
| Intake Flow Rate [m/s] |  | 4.28 | 4.36 | 4.35 | 4.10 | 4.47 | 4.54 |
| Result |  | o | o | o | x | x |  |

When the noise was reduced by 10% or more and intake flow rate was reduced by 5% or less, as compared to the reference axial-flow fan attached with no filter, the result was evaluated as o, and the result was evaluated as x when the noise reduction and intake flow rate reduction were outside the range.

In the experiments 5-1 to 5-3, the noise was reduced by more than 10% as compared to the reference axial flow fan having no filter and intake flow rate was reduced by less than 5%. On the other hand, in comparison 5-1, though the noise was reduced, the intake flow rate was also greatly reduced. When the opening ratio Q was less than 70%, the air flow was stagnant and flow rate was reduced. Further, in comparison 5-2, since the opening diameter R was more than 3 mm and it was difficult to align the air flow, no noise reduction effect was obtained.

Accordingly, it was confirmed that a filter having opening diameter R of not less than 0.3 mm and not more than 3 mm and opening ratio Q of not less than 70% could reduce the noise without detrimentally interfering with the intake flow rate. Especially, considering processability of the filter, the opening ratio Q may preferably be not less than 70% and not more than 90%.

Incidentally, since a difference resulting from the opening configuration was hardly confirmed in the experiments 5-1 to 5-3, it is assumed that the same effects can be obtained using the filter 715D having circular opening and other filters having openings of other than tetragonal or hexagonal shape, as long as the opening diameter R and the opening ratio Q are within the above range.

What is claimed is:

1. An axial-flow fan, comprising:
    a main shaft;
    a plurality of main fins provided on the outer circumference of the main shaft, the main fins being inclined relative to an axial direction of the main shaft, where a front end in a rotary direction of the main fins is located on an intake side and a rear end in the rotary direction of the main fins is located on an exhaust side when the axial-flow fan transfers air; and
    an auxiliary fin provided between mutually adjoining main fins,
    wherein the height of the auxiliary fin from the front end to the rear end in the rotary direction of the auxiliary fin along the axial direction of the main shaft is not less than half and not more than four fifths of the height of the main fins from the front end to the rear end of the main fins in the rotary direction along the axial direction of the main shaft, and
    wherein, when the main fins are arranged by a pitch W, the front end in the rotary direction of the auxiliary fin is located within $-\frac{1}{8} \times W$ to $+\frac{1}{8} \times W$ along the rotary direction from the front end in the rotary direction of the main fins adjoining in a reverse rotary direction.

2. The axial-flow fan according to claim 1, wherein the rear end in the rotary direction of the auxiliary fin is spaced apart from the rear end in the rotary direction of the main fins adjoining in the reverse rotary direction by $\frac{1}{2} \times W$ in the rotary direction.

3. The axial-flow fan according to claim 1, wherein, when an attachment angle of the auxiliary fin relative to the main shaft is $\theta_2$ and an attachment angle of the main fins relative to the main shaft is $\theta_1$, the maximum of $\theta_2$ is represented as $\theta_2 = \theta_1 + 5°$.

4. The axial-flow fan according to claim 1,
    wherein the cross section of the main fins along the axial direction of the main shaft is one of streamlined and approximately streamlined, and
    wherein the cross section of the auxiliary fin is one of similar and approximately similar to the main fins.

5. The axial-flow fan according to claim 1, wherein the thickness of the cross section of the auxiliary fin taken along the axial direction of the main shaft is not more than the thickness of the cross section of the main fins taken along the axial direction of the main shaft.

6. The axial-flow fan according to claim 1, wherein one of the main fins is arranged to be superposed on the adjoining main fin when being seen from the exhaust side.

7. The axial-flow fan according to claim 1, wherein a mirrored surface is formed on a positive pressure side and a negative pressure side of the main fins.

8. The axial-flow fan according to claim 1, further comprising:
    a motor that drives the main shaft;
    a cylindrical frame that accommodates the main shaft, the main fins, the auxiliary fin and the motor, the frame having openings on the intake side and the exhaust side; and
    a spoke extending from an edge of the opening on the exhaust side of the frame approximately to a center of the opening to hold the motor,
    wherein the spoke works as a guide fin in discharging air transferred by the main fins toward the outside of the frame.

9. The axial-flow fan according to claim 8, wherein the spoke is curved in a direction opposite to the rotary direction of the main fins, and has a curved surface adapted to scoop up the air transferred by the main fins.

10. The axial-flow fan according to claim 8, wherein the frame is made of one of a metal and a resin having high thermal conductivity.

11. The axial-flow fan according to claim 1, further comprising:
    a frame that accommodates the main shaft, the main fins, the auxiliary fin and a motor for driving the main shaft, the frame having openings on the intake side and an exhaust side; and
    a straightening plate having a tapered configuration of which a diameter of the plate becomes greater toward a direction opposite to a direction for transferring the air.

12. The axial-flow fan according to claim 1, further comprising:
    a frame that accommodates the main shaft, the main fins, the auxiliary fin and a motor for driving the main shaft, the frame having openings on the intake side and an exhaust side; and
    a filter attached on the frame to cover the opening on the intake side.

13. The axial-flow fan according to claim 12, wherein the opening of the filter has one of a polygonal and a circular profile, and
    wherein the thickness of the filter is not less than 0.1 mm and not more than 5 mm.

14. The axial-flow fan according to claim 13, wherein a diameter of the opening of the filter is not less than 0.3 mm and not more than 3 mm, and
    wherein an opening ratio of the filter is not less than 70% and not more than 90%.

15. The axial-flow fan according to claim 12, wherein a predetermined gap is secured between the filter and the opening of the frame.

16. The axial-flow fan according to claim 1, further comprising:
    a frame that accommodates the main shaft, the main fins, the auxiliary fin and a motor for driving the main shaft, the frame having openings on the intake side and an exhaust side; and a cylindrical cover having a louver attached thereto, the cover being provided on the exhaust side of the frame, wherein the louver includes a plurality of louver components extending from the center of the cover to the periphery thereof, the louver components working as a guide fin in discharging air transferred by the main fins toward the outside of the frame.

17. The axial-flow fan according to claim 16, wherein the louver component is inclined in a direction opposite to the inclination of the main fins.

18. The axial-flow fan according to claim 1, further comprising:

a frame that accommodates the main shaft, the main fins, the auxiliary fin and a motor for driving the main fins, the frame having openings on the intake side and an exhaust side; and a cylindrical cover having a louver attached thereinside, the cover being provided on the exhaust side of the frame, wherein the louver includes a plurality of louver components disposed approximately in parallel, and wherein the space between the adjoining louver components where light-shielding surfaces of the louver components are approximately orthogonal to the inclination of the main fins is broader than the space between the louver components where the light-shielding surfaces are approximately parallel to the inclination of the main fins.

19. The axial-flow fan according to claim 16, wherein a predetermined gap is secured between the louver and the opening of the frame on the exhaust side.

20. A projector, comprising:

an optical system including an optical modulator that modulates a light beam irradiated by a light source in accordance with image information to project the light beam in an enlarged manner to form a projection image, and a fan for circulating an air, wherein the fan is the axial-flow fan according to claim 1.

21. The projector according to claim 20, wherein the rear end in the rotary direction of the auxiliary fin is spaced apart from the rear end in the rotary direction of the main fins adjoining in the reverse rotary direction by ½×W in the rotary direction.

22. The projector according to claim 20, wherein, when an attachment angle of the auxiliary fin relative to the main shaft is $\theta_2$ and an attachment angle of the main fins relative to the main shaft is $\theta_1$, the maximum of $\theta_2$ is represented as $\theta_2 = \theta_1 + 5°$.

23. The projector according to claim 20, wherein the cross section of the main shaft is one of streamlined and approximately streamlined, and wherein the cross section of the auxiliary fin is one of similar and approximately similar to the main fins.

24. The projector according to claim 20, wherein the thickness of the cross section of the auxiliary fin taken along the axial direction of the main shaft is not more than the thickness of the cross section of the main fins taken along the axial direction of the main shaft.

25. The projector according to claim 20, wherein one of the main fins is arranged to be superposed on the adjoining main fins when being seen from the exhaust side.

26. The projector according to claim 20, wherein a mirrored surface is formed on a positive pressure side and a negative pressure side of the main fins.

27. The projector according to claim 20, further comprising:

a motor that drives the main shaft;

a cylindrical frame that accommodates the main shaft, the main fins, the auxiliary fin and the motor, the frame having openings on the intake side and the exhaust side; and a spoke extending from an edge of the opening on the exhaust side of the frame approximately to a center of the opening to hold the motor, wherein the spoke works as a guide fin in discharging air transferred by the main fins toward the outside of the frame.

28. The projector according to claim 27, wherein the spoke is curved in a direction opposite to the rotary direction of the main fins, and has a curved surface adapted to surface adapted to scoop up the air transferred by the main fins.

29. The projector to claim 27, wherein the frame is made of one of a metal and a resin having high thermal conductivity.

30. The projector to claim 20, further comprising:

a frame that accommodates the main shaft, the main fins, the auxiliary fin and a motor for driving the main shaft, the frame having openings on the intake side and an exhaust side; and a straightening plate having a tapered configuration of which a diameter of the plate becomes greater toward a direction opposite to a direction for transferring the air.

31. The projector according to claim 20, further comprising:

a frame that accommodates the main shaft, the main fins, the auxiliary fin and a motor for driving the main shaft, the frame having openings on the intake side and an exhaust side; and a filter attached on the frame to cover the opening on the intake side.

32. The projector according to claim 31, wherein the opening of the filter has one of a polygonal and a circular profile, and wherein the thickness of the filter is not less than 0.1 mm and not more than 5 mm.

33. The projector according to claim 32, wherein a diameter of the opening of the filter is not less than 0.3 mm and not more than 3 mm, and wherein an opening ratio of the filter is not less than 70% and not more than 90%.

34. The projector according to claim 31, wherein a predetermined gap is secured between the filter and the opening of the frame.

35. The projector according to claim 20, further comprising:

a frame that accommodates the main shaft, the main fins, the auxiliary fin and a motor for driving the main shaft, the frame having openings on the intake side and an exhaust side; and a cylindrical cover having a louver attached thereto, the cover being provided on the exhaust side of the frame, wherein the louver includes a plurality of louver components extending from the center of the cover to the periphery thereof, the louver components working as a guide fin in discharging air transferred by the main fins toward the outside of the frame.

36. The projector according to claim 35, wherein the louver component is inclined in a direction opposite to the inclination of the main fins.

37. The projector according to claim 20, further comprising:
- a frame that accommodates the main shaft, the main fins the auxiliary fin and a motor for driving the main fins, the frame having openings on the intake side and an exhaust side; and
- a cylindrical cover having a louver attached thereinside, the cover being provided on the exhaust side of the frame,
- wherein the louvr includes a plurality of louver components disposed approximately in parallel, and
- wherein the space between the adjoining louver components where light-shielding surfaces of the louver components are approximately orthogonal to the inclination of the main fins is broader than the space between the louver components where the light-shielding surfaces are approximately parallel to the inclination of the main fins.

38. The projector according to claim 35, wherein a predetermined gap is secured between the louver and the opening of the frame on the exhaust side.

* * * * *